(12) United States Patent
Lee et al.

(10) Patent No.: US 10,402,250 B2
(45) Date of Patent: Sep. 3, 2019

(54) DIGITAL SIGNAGE AND METHOD OF CONTROLLING THE SAME

(71) Applicant: LG ELECTRONICS INC., Seoul (KR)

(72) Inventors: Seunghun Lee, Seoul (KR); Youngran Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 166 days.

(21) Appl. No.: 15/626,481

(22) Filed: Jun. 19, 2017

(65) Prior Publication Data

US 2018/0129551 A1 May 10, 2018

(30) Foreign Application Priority Data

Nov. 10, 2016 (KR) .................. 10-2016-0149489

(51) Int. Cl.
| | |
|---|---|
| *G06F 11/00* | (2006.01) |
| *G06F 11/07* | (2006.01) |
| *G06Q 30/02* | (2012.01) |
| *G09F 9/30* | (2006.01) |
| *H04N 21/433* | (2011.01) |
| *H04N 21/4425* | (2011.01) |
| *H04N 21/222* | (2011.01) |

(52) U.S. Cl.
CPC ...... *G06F 11/0769* (2013.01); *G06F 11/0706* (2013.01); *G06F 11/0757* (2013.01); *G06Q 30/0241* (2013.01); *G06Q 30/0272* (2013.01); *G09F 9/30* (2013.01); *H04N 21/2223* (2013.01); *H04N 21/4331* (2013.01); *H04N 21/4425* (2013.01)

(58) Field of Classification Search
CPC .................................................. G06F 11/0706
USPC .................................. 714/57, 48, 51, 54, 55
See application file for complete search history.

(56) References Cited

U.S. PATENT DOCUMENTS

| | | | | |
|---|---|---|---|---|
| 2004/0148555 | A1* | 7/2004 | Blackburn | H04H 20/38 714/747 |
| 2005/0021744 | A1* | 1/2005 | Haitsuka | H04L 12/2856 709/224 |
| 2010/0223114 | A1* | 9/2010 | Yao | G06Q 30/02 705/14.12 |
| 2013/0182001 | A1* | 7/2013 | Hwang | G06Q 30/02 345/581 |
| 2013/0195420 | A1 | 8/2013 | Biggs et al. | |
| 2013/0238926 | A1 | 9/2013 | Michaelson et al. | |
| 2014/0146183 | A1* | 5/2014 | Ouyang | H04N 5/44 348/180 |

FOREIGN PATENT DOCUMENTS

| | | |
|---|---|---|
| KR | 10-2013-0064953 A | 6/2013 |
| WO | WO 2014/047798 A1 | 4/2014 |
| WO | WO 2016/043608 A1 | 3/2016 |

* cited by examiner

*Primary Examiner* — Dieu Minh T Le
(74) *Attorney, Agent, or Firm* — Birch, Stewart, Kolasch & Birch, LLP

(57) ABSTRACT

A digital signage including a memory; a display; and a controller configured to display content on the display, capture a plurality of images of the displaced content, store the plurality of captured images in the memory, and display the stored images on the display in response to an error event signal.

12 Claims, 28 Drawing Sheets

FIG. 26
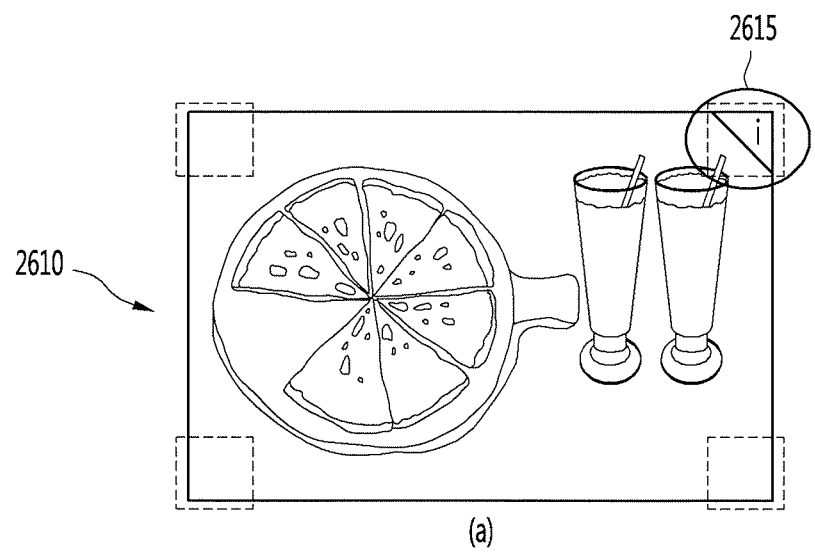
(a)
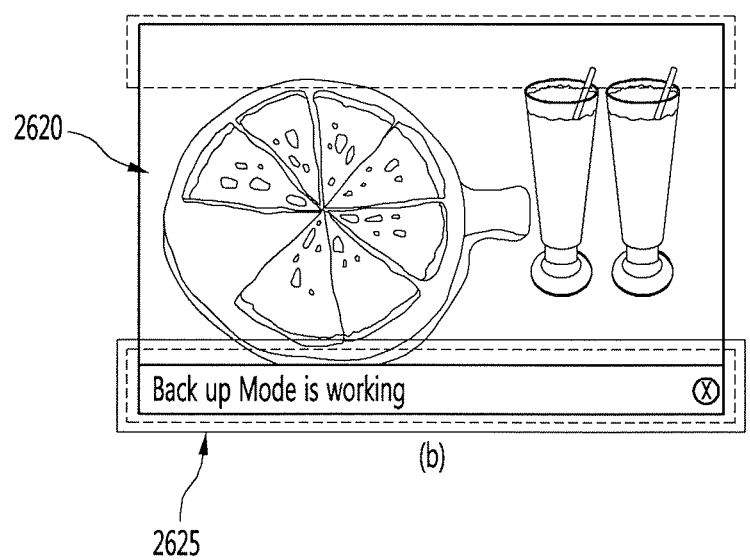
(b)

DIGITAL SIGNAGE AND METHOD OF CONTROLLING THE SAME

CROSS REFERENCE TO THE RELATED APPLICATIONS

This non-provisional application claims the benefit under 35 U.S.C. § 119(a) to Patent Application No. 10-2016-0149489, filed in Republic of Korea on Nov. 10, 2016, which is hereby expressly incorporated by reference into the present application.

BACKGROUND OF THE INVENTION

Field of the Invention

The present invention relates to a digital signage and, more particularly, to a method of controlling a digital signage for processing an error event generated in the digital signage.

Description of the Related Art

In a related art advertisement method, generally, advertisement content is provided through advertisement flyers offline or through the Internet, a TV or a radio online. However, in the related art advertisement method, fixed information is unilaterally provided to users. In addition, since an owner and creator of the advertisement content are different, it is difficult to rapidly correct, change or update already created advertisement content. Thus, wrong information may be delivered to a user, causing misunderstanding between the user and an advertiser.

In public places such as shopping malls or airports, display devices are used to output advertisement content. However, even in this instance, previously created advertisement content is repeatedly played back and access of a user to information is still restricted.

In addition, a manager cannot check error or malfunction of a display device for outputting advertisement content without continuous monitoring and cannot cope with error or malfunction in real time. In addition, since the manager should directly check the cause of error or malfunction and the current state of the display device on the spot, it takes considerable time and cost to take follow-up measures, thereby causing inefficiency. In addition, such a problem may cause dissatisfactions of users, resulting in prejudice against shopping malls or airports. Further, wrong information may be delivered, the user may be inconveniences or the appearance of facilities may be spoiled.

SUMMARY OF THE INVENTION

Accordingly, one object of the present invention is to provide an interactional digital signage system.

Another object of the present invention is to provide an efficient error management/processing system and method in the interactional digital signage system.

Yet another object of the present invention is to provide a digital signage control method of actively processing an error without user interaction.

To achieve these and other advantages and in accordance with the purpose of the present invention, as embodied and broadly described herein, the present invention provides in one aspect a digital signage including a memory; a display; and a controller configured to display content on the display, capture a plurality of images of the displayed content, store the plurality of captured images in the memory, and display the stored images on the display in response to an error event signal.

In another aspect, the present invention provides a digital signage including a memory; a display; and a controller configured to display a first set of images of content during a first predetermined time interval, capture and store the first set of images in the memory, display a second set of images of content during a second predetermined time interval, capture and store the second set of images in the memory, in response to a first error event signal indicating an error has occurred in displaying at least one image included in the first set of images, display the stored first set of images in a looping manner, and in response to a second error event signal indicating an error has occurred in displaying at least one image included in the second set of images, display the stored second set of images in a looping manner.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 26 is a diagram illustrating an example in which a digital signage according to an embodiment of the present invention displays an error event indicator on a captured image.

DETAILED DESCRIPTION OF THE EMBODIMENTS

Figure 1:
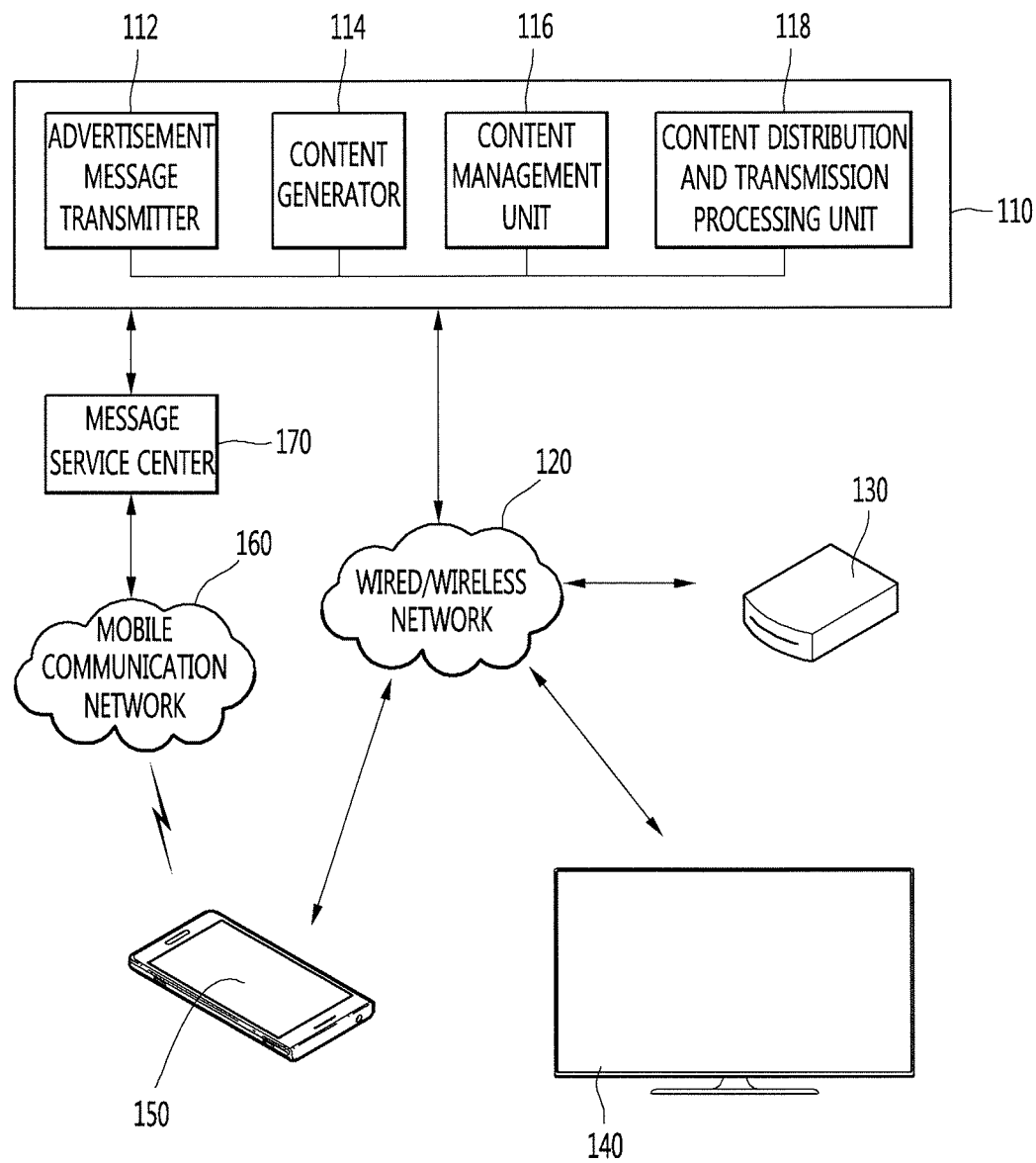
FIG. 1 is a diagram showing an example of a digital signage system according to an embodiment of the present invention.

Hereinafter, a digital signage system and a method of controlling the same according to an embodiment of the present invention will be described in detail with reference to the accompanying drawings. The accompanying drawings are only exemplary and not intended to assert or imply any limitation with regard to the present invention.

In addition, the same or similar portions are denoted by the same reference numerals and a repeated description thereof will be omitted. For convenience of description, the sizes and shapes of the components may be exaggerated or reduced. Although the terms first, second, etc. may be used herein to describe various elements, these elements should not be limited by these terms. These terms are only used to distinguish one element from another. The suffixes "module" and "unit" of elements herein are used for convenience of description and thus can be used interchangeably.

Hereinafter, an interactional digital signage system and an error management/processing system and method in the interactional digital signage system according to an embodiment of the present invention will be described with reference to the accompanying drawings.

In addition, the term "digital signage" described in this specification may be used to collectively refer to display advertisement boards for delivering information and advertisements by combining various IT technologies such as hardware, software, content and networks. Such a digital signage may be mounted on large buildings or places with a large floating population, such as terminals, public offices, bus stops, department stores, subways, airports, hotels, hospitals or public places where persons stay for predetermine times, such as elevators, theaters, restaurants, shopping malls or shops.

As a digital signage, a stand-alone digital signage may configure a signboard or billboard using a digital information display such as a plasma display panel (PDP), a liquid crystal display (LCD), a light emitting diode (LED), etc., store pre-created information and advertisement content in a memory, and manually reproduce the information and advertisement content. As another digital signage, a networked digital signage may transmit information and advertisement content to a digital information display through a communication network and perform content transmission and device state management at the center thereof Such a digital signage is an example of a display device. Hereinafter, in some cases, the digital signage and the display device may be used interchangeably.

Such a digital signage is an intelligent network TV capable of supporting at least one of, for example, a broadcast reception function, a computer support function and the Internet function and may include various interfaces such as a handwriting type input device, a touchscreen or a pointing device. Such a display device may support a wired or wireless networking and perform e-mailing, web-browsing, banking or gaming through connection with the Internet and/or other digital devices. Meanwhile, the display device may use a general-purpose OS standardized to support the above-described functions. Accordingly, the display device may freely add or delete various applications on the general-purpose OS kernel to perform more user-friendly functions.

The term "mobile device" described in this specification is, for example, a portable communication device, a portable computer, a portable terminal, and may include conveniently used interfaces such as a display screen, a touch input unit and/or a small keyboard. In addition, such a mobile device performs e-mailing, web-browsing, banking or gaming through connection with the Internet and other digital devices through a wireless Internet function like the above-described digital signage, and use a standardized general-purpose OS.

Hereinafter, various embodiments of the present invention will be described in detail with reference to the accompanying drawings. However, this is merely exemplary for convenience of description and better understanding of the present invention and the scope of the present invention is not limited or restricted by the embodiments.

An example of a digital signage system for managing/processing an error according to an embodiment of the present invention may include a server for generating, distributing and transmitting advertisement content to a display device and controlling the digital signage system, the display device for outputting the advertisement content received from the server, and a mobile device for downloading and installing a first application for managing/processing an error, requesting to check whether an error is generated from the display device through the first application, receiving a response, generating and outputting an error display user interface (UI) on a screen according to the response, and managing and processing the error of the display device using the error display UI. The error includes an error in displaying the content on the display and an error in receiving the content from a server The mobile device can perform cross-authentication and registration with at least one of the server and a linked display device, check a network connection state, request the first application and a second application for system management from the Web or the server, download and install the applications, monitor the state of the display device, marking a display in which an error has been generated, and output detailed information of the error generated in the marked display device.

The detailed information of the error may include at least one of an error state screenshot, error state details, a contact point for processing the error state and link information of the display device. In addition, the request and response can be transmitted/received in the form of a message or packet, the message or packet may include metadata regarding the request and response, and the metadata may include an errorEvent element including error event information related to at least one of a network, a display device, a player and content.

The metadata may further include at least one of a name element including the name or identifier for identifying a player, a playerinfo element including basic information of the player, a locationInfo element including location information of the player, a contentInfo element including basic information of content, a contentChannel element including transmission/reception channel information of the content, a contentplayLog element including log information related to content playback, a playerEvent element including event information of a player related to the content and a reserved element for other information or future use. In addition, the errorEvent element may include at least one sub-element related to identifier information of a display device in which an error has been generated, information on a time when the error has been generated, information on a cause of the error, the location information of the display device and contact point information according to the information on the cause of the error.

The mobile device can search for or refresh an available network according to the cause of the error of the display device, output information corresponding thereto, switch to an alternative network, check the output state of the display device according to the switched alternative network and finish an error management/processing procedure.

FIG. 1 is a diagram showing an example of a digital signage system according to an embodiment of the present invention. As described above, the digital signage is a communication tool for enabling marketing, advertisement and training effects of enterprises and customer experiences and includes all digital devices for providing broadcast programs or specific information at public places such as airports, hotels, hospitals, etc. Such a digital signage may provide software or management platform capable of controlling a commercial digital information display. Meanwhile, hereinafter, in this specification, the digital signage will be described as a display device.

Referring to FIG. 1, the example of the digital signage system according to an embodiment of the present invention includes a first server 110, a second server 130, a display device 140 and a mobile device 150. The components configuring the digital signage system of FIG. 1 can be connected to each other through a first communication network and the server 110 and/or 130 and the mobile device 150 can be connected to each other through a second communication network. The first communication network may be a wired/wireless network 120 for enabling data transmission and reception and may include, for example, the Internet, and the second communication network may include a mobile communication network 160 for a message service and a call service. For the second communication network, a message service center 170 may be further included, without being limited thereto.

The first server 110 and the second server 130 may be respectively referred to as a content server and a central server and perform different functions or may be combined into one component. Hereinafter, for convenience of description and better understanding of the present invention, the first server and the second server will be configured as independent components without being limited thereto.

The first server 110 generates, manages and processes a variety of data, that is, content, such as advertisement data, message data, etc. Thus, the first server 110 may include an advertisement message transmitter 112, a content generator 114, a content management unit 116 and a content distribution/transmission processing unit 118. The first server 110 may be regarded as a component for generating, managing and processing a variety of content provided through the display device 140 of the digital signage system. Accordingly, in order to perform such functions, some of the above-described components of the first server 110 may be omitted, some components may be further added to the first server, or some of the above-described components may be combined.

The advertisement message transmitter 112 can transmit an advertisement message related to content output from the display device 140 or a message related to an error generated in a predetermined display device to the mobile device 150. The advertisement message may include at least one of product information, discount information, event information, a mobile coupon or a mobile ticket related to content, for example. In addition, the error message will be described in detail below and a detailed description thereof will be omitted herein.

The content generator 114 can generate content to be output through the display device 140. Further, the content generator 114 can directly generate content or process or modify content already generated by another system according to the output format of the display device 140.

The content management unit 116 manages the generated content using a database management system (DBMS), for example. In other words, the content management unit 116 manages a plurality of pieces of content according to services types such as information on content to be output through the display device 140, schedule information, etc. The content management unit 116 can also perform transmission of content to the display device 140 and state management of the display device 140 after transmission. Thus, the content management unit 116 can execute the content at an appropriate time and report information on the executed result, thereby performing efficient integrated management, advertisement effect measurement and error state management of the content.

The content schedule information is used to manage schedules related to transmission, reception, output or state reporting of content between the content management unit and the display device 140 and may be mainly used to manage the time of the content to be output through the display device 140. Accordingly, the content schedule information may include identification information of the display device, time information and version information considering system compatibility as basic information and may further include definition of an execution order or an execution rule. The digital signage system can also acquire content execution verification information, advertisement index analysis information, etc. from the display device 140 through the content schedule information. The content schedule information may further include used network information (network provider information, a network connection type for identifying a wired or wireless network, etc.), content execution information, etc. and thus may be useful in a digital signage system including a plurality of display devices. The content distribution/transmission processing unit 118 distributes and transmits the content generated by the content generator 114 to each display device 140.

According to a content transmission method, there are a polling method of, at the display device 140, requesting content from a server at a predetermined period and a broadcast method of transmitting content from the server to the display device 140 periodically or aperiodically. In the polling method, the content can be output through the display device 140 even without schedule management of a manager, but a problem may be generated due to server traffic concentration when a plurality of display devices performs polling.

Therefore, there is a need for traffic load balancing. In contrast, in the broadcast method, content can be distributed at night when network utilization is low for efficient utilization of restricted bandwidth and increase in multimedia data service, thereby preventing traffic concentration. However, bandwidth problems may be caused if frequent content update or fast transmission is required. Accordingly, in the present invention, at least one of the above-described two methods and a combination thereof may be used to transmit content.

The second server 130 controls the central server. That is, the digital signage system and can perform the functions of the first server 110 in some cases or serve as a link for control and communication between the mobile device 150 and the display device 140 as described below. In addition, the second server 130 or the first server 110 can manage the display device 140 and the mobile device 150 using a digital signage management program using the Web and store/control information related to content.

Referring to FIG. 1, at least one server, the display device 140 and the mobile device 150 may be established in 1:1 or 1:N (N being a positive integer equal to or greater than 2) correspondence. The display device 140 can output content received from the first server 110 under control of the second server 130. Further, the mobile device 150 can interact with the display device 140 to create an active custom-made advertisement and receive a message related to content which is being output on the display device 140 from the server to be used as an advertisement marketing tool.

The content is generated and managed by the first server 110 and distributed/transmitted to and output through the display device 140. In this instance, a local manager should manage the content distribution unit 118, the display device 140 and the output content through the first or second server 110 or 130. Accordingly, there may be a difficulty in responding in real time upon local handling of a manager, such as instant discount sale, event information guide, etc.

As described above, although content is generated and managed through the second server 130 and transmitted to the display device 140, content may be transmitted to a specific display device in real time or the mobile device 150 may be supported such that a manager can directly transmit content to a display device. Further, the display device 140 displays digital information and advertisement related content configured in the form of video, images or text according to a content playback schedule received from the first server 110 and transmits an advertisement message related to the output content to the communication-capable mobile device 150.

In addition, an approach is required to control the first server 110, the display device 140, the content, etc. For example, an approach is required to turn the first server 110 on, approaching the display device 140 is required to turn the display device 140 on or control the volume level of the display device, and access to the first or second server 110 or 130 is required to control content, thereby inconveniencing the manager. Therefore, in an embodiment of the present invention, the content distribution unit 118 and the display device 140 of the digital signage system and the output content can be controlled through the mobile device 150, thereby maximizing mobility and convenience of the manager.

Figure 2:
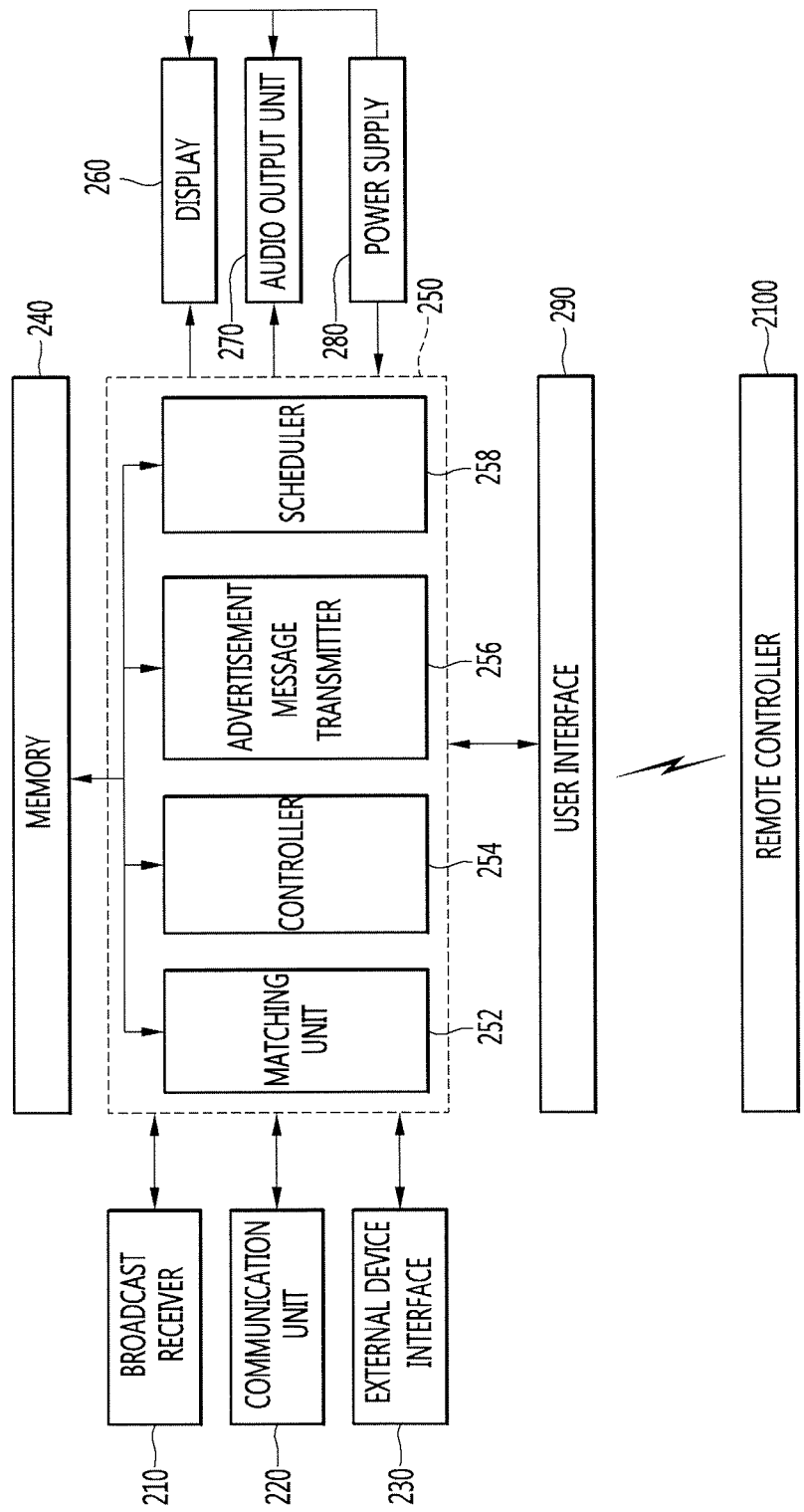
FIG. 2 is a block diagram showing an example of the configuration of a display device according to an embodiment of the present invention.

Next, FIG. 2 is a block diagram showing an example of the configuration of a display device according to an embodiment of the present invention. As shown in FIG. 2, the example of the display device includes a broadcast receiver 210, a communication unit 220, an external device interface 230, a memory 240, a matching unit 252, a controller 254, an advertisement message transmitter 256, a scheduler 258, a display 260, an audio output unit 270, a power supply 280, a user interface 290 and a remote controller 2100. The components of FIG. 2 are merely exemplary and some of the components may be deleted or combined into one module or some components may be added if necessary, which is within the scope of the present invention.

The digital signage system can use display devices controlled to display content in various manners. Such a system can display advertisement materials and an advertiser can purchase display time. Accordingly, the display device according to an embodiment of the present invention may include the broadcast receiver 210 and output a received broadcast program if content does not need to be output. Since the broadcast receiver 210 is provided, general TV viewing is possible when advertisements are not being output, thereby increasing availability of the display device.

The broadcast receiver 110 corresponds to a general digital broadcast receiver including a tuner, a demodulator, a decoder, etc. The communication unit 220 may include an Ethernet terminal for a wired network, and Wireless Local Area Network (WLAN) (i.e., Wi-Fi), Wireless Broadband (WiBro), World Interoperability for Microwave Access (Wi-Max) and High Speed Downlink Packet Access (HSDPA) for a wireless network, and perform data transmission and reception using the same. In addition, the communication unit 220 can select and receive a desired application from among application opened to the public through a network.

The external device interface 230 connects the display device to an external device. Through the external device interface 230, the display device can be connected to an external device such as a Digital Versatile Disc (DVD) player, a Blu-ray disc player, a game console, a camera, a camcorder, a personal computer (PC), a tablet PC or a smartphone in a wired/wireless manner. Then, the external device interface 230 can receive and transmit an application or an application list of an adjacent external device to the controller 254 or the memory 240.

In addition, the display device of FIG. 2 can be connected to the first server 110 and/or the second server 130 of FIG. 1 through the communication unit 220 and/or the external device interface 230 to receive and output content. The memory 240 can receive and store content, metadata of the content, etc. from the server or the mobile device. In addition, the memory 240 can temporarily store audio, video and data signals received through the external device interface 230 or the network interface 220. Further, the memory 240 can receive and store an application or an application list received through the external device interface 230 or the communication unit 220. The memory 240 can be implemented by an Electrically Erasable Programmable Read-Only Memory (EEPROM), etc.

The user interface 290 transmits a signal input by a user to the controller 254 or transmits a signal of the controller 140 to a user. For example, the user interface 290 can receive and process various control signals such as a power on/off signal, a channel selection signal or a screen setting signal from the remote controller 2100 or transmit a control signal of the controller 140 to the remote controller 2100, according to various communication methods such as a radio frequency (RF) communication method, an infrared (IR) communication method, etc.

The display 260 can display the content received from the mobile device 150. In addition, the display 260 can convert the video signal, the data signal and the OSD signal processed by the controller 254 or the video signal and the data signal received by the external device interface 230 into RGB signals and generate a drive signal. The display 260 can be a Plasma Display Panel (PDP), a Liquid Crystal Display (LCD), an Organic Light-Emitting Diode (OLED) display, a flexible display or a 3D display.

The audio output unit 290 can receive a processed audio signal (e.g., a stereo signal, a 3.1-channel signal, a 5.1-channel signal or a 6-channel signal) from the controller 254 and output the received audio signal as voice. The power supply 280 serves to supply power to the components of the display device of FIG. 2. For example, the power supply 280 can supply power to the controller 254 implemented in the form of a system on chip (SOC), the display 260 for displaying video and the audio output unit 270 for outputting audio.

The remote controller 2100 transmits user input to the user interface 290. Thus, the remote controller 2100 can use, for example, Bluetooth, radio frequency (RF) communication, infrared (IR) communication, Ultra Wideband (UWB), ZigBee, RS-232, RS-485, etc. Hereinafter, assume that the remote controller 2100 is a mobile device. In particular, the display device capable of efficiently providing information and advertisement of interest to a user using the mobile device 2100 will now be described in greater detail.

In order for the communication unit 220 to receive user related data from the mobile device 150 located near the display device, the controller 254 senses whether the mobile device is within communication range or is in a communication-capable state at a predetermined period and controls the communication unit 220. The display device and the mobile device 150 can perform communication using a mobile communication network, Radio-Frequency Identification (RFID), ZigBee, Bluetooth, Ultra Wideband (UWB), etc. A method of sensing whether the mobile device 150 is in a communication-capable state, such as signal strength measurement, can be changed according to a communication method and the present invention is not limited to a specific communication method. In addition, the method of sensing the communication-capable state according to the communication method is well-known and thus a detailed description thereof will be omitted.

If the mobile device 150 capable of performing communication is sensed, the communication unit 220 receives information on the sensed mobile device 150 from the controller 254 and receives user related data from the mobile device 150. The mobile device 150 can transmit the user related data of the mobile device 150 to the display device through the stored application.

The user related data can include at least one of a location, an age, a gender, a product of interest, a field of interest and a purchase history of a user, in order to provide behavioral advertisements per user based on the user related data. Meanwhile, the user related data can be set in an application stored in the mobile device 150.

The memory 240 stores metadata of content and an advertisement message related to the content. In particular, if content is an advertisement, the memory 240 can store metadata including data such as ages or genders of target users of the advertisement. The metadata of the content can include matching elements and content associated with the user related data can be extracted and provided through the metadata.

As described above, the mobile device 150 transmits user input to the user interface 290. The controller 254 controls the display device in correspondence with a control signal received from the mobile device 150. In addition, the controller 254 can control the communication unit 220 to transmit the received content and received information corresponding to the content to the mobile device 150 or the server by referring to the memory 240, if a signal for requesting content distribution state information is received from the mobile device 150 or the server.

Figure 3:
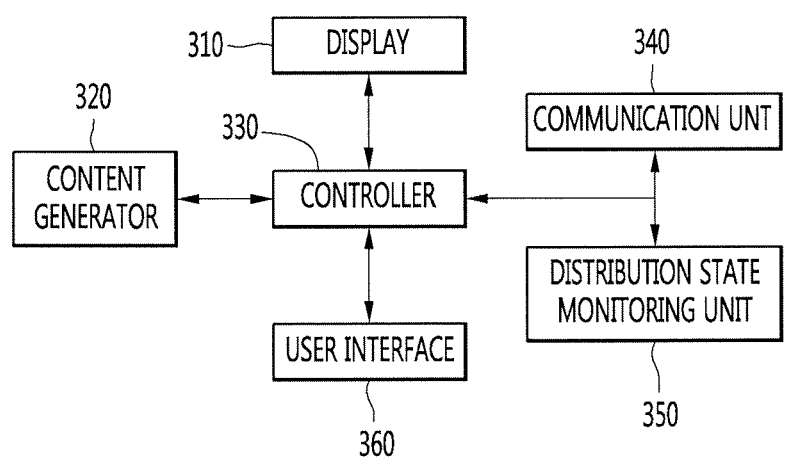
FIG. 3 is a block diagram showing an example of the configuration of a mobile device according to an embodiment of the present invention.
Figure 4:
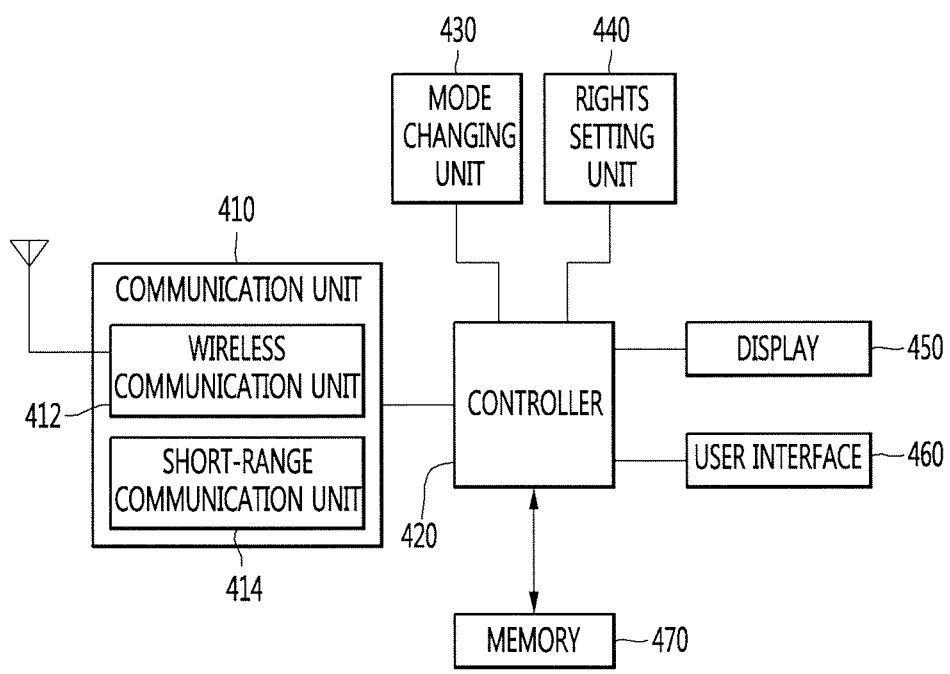
FIG. 4 is a block diagram showing another example of the configuration of a mobile device according to an embodiment of the present invention.

Next, FIG. 3 is a block diagram showing an example of the configuration of a mobile device according to an embodiment of the present invention, and FIG. 4 is a block diagram showing another example of the configuration of a mobile device according to an embodiment of the present invention.

The components shown in FIGS. 3 and 4 are merely exemplary and some of the components can be deleted or combined into one module or some components can be added if necessary, which is within the scope of the present invention. The mobile device according to an embodiment of the present invention can be a combination of FIGS. 3 and 4, although not shown.

Referring to FIG. 3, the example of the mobile device includes a display 310, a user interface 360, a content generator 320, a communication unit 340, a controller 330 and a distribution state monitoring unit 350. The display 310 can convert the video signal and the data signal processed by the controller 330 or the video signal and the data signal received by an external device into RGB signals and generate a drive signal. The display 310 can be a Plasma Display Panel (PDP), a Liquid Crystal Display (LCD), an Organic Light-Emitting Diode (OLED) display, a flexible display or a 3D display. The display 310 can display list information including at least one source device.

Referring to FIG. 4, the example of the mobile device includes a communication unit 410, a mode changing unit 430, a display 450, a user interface 460, a controller 420, a memory 470 and a rights setting unit 440. The communication unit 410 can include a wireless communication unit 412 in order to receive an advertisement message related to content from the server, as described above. The wireless communication unit 412 performs a communication function between the mobile device and a base station and can include a duplexer for dividing transmission and reception functions, a transmitter for up-converting the frequency of a transmitted signal and a receiver for down-converting the frequency of a received signal. A mobile device without a call function, such as a tablet PC, can not include the wireless communication unit 412.

In addition, the communication unit 410 can search for at least one display device capable of performing communication at a predetermined period. Further, the communication unit 410 can determine whether registered display devices are in a communication-capable state using location information including at least one of an Internet protocol (IP) address, a MAC address and a global positioning system (GPS). For example, the communication unit 410 can store a plurality of IP addresses, MAC addresses, etc. and attempt to sequentially access the plurality of IP addresses, MAC addresses, etc. at a predetermined time interval to determine whether communication is possible. In addition, the communication unit 410 can determine whether a display device capable of performing communication is present within a short distance if the mobile device is located at a pre-stored GPS position. If the location information is used, it is easy to determine whether a specific display device is in a communication-capable state.

The communication unit 410 can determine whether a communication-capable display device is present through a local area network (LAN) such as Bluetooth, without using the location information. Accordingly, the communication unit 410 can include a short-range communication unit 414 for transmitting and receiving data to and from another display device located within a predetermined range.

The data can mean all data which can be stored in a device, such as audio, video, and images, and can further include content and content metadata. The content can be predetermined types of identifiable data stored in the device, such as photos, music, documents, video, etc. In other words, as the data stored in the device, data related to photos can be stored as photo content and data related to music can be stored as music content. In addition, the short-range communication unit 414 can use various wireless short-range communication modules such as Bluetooth, ZigBee, RFID, NFC and Wi-Fi.

Since at least one communication-capable display device is searched for at the predetermined time interval, a control target list and graphics data related thereto can be automatically displayed upon approaching a communication-capable display device. The mode changing unit 430 changes a mode to a control mode when the communication-capable display device is found. Upon changing to the control mode, the display 450 can display a control target list including at least one of a communication-capable display device, content capable of being displayed on the display device and a content distribution device for transmitting content to the display device.

In addition, the display 450 can convert the video signal and the data signal processed by the controller 420 or the video signal and the data signal received by an external device into RGB signals and generate a drive signal. The display 450 can be a Plasma Display Panel (PDP), a Liquid Crystal Display (LCD), an Organic Light-Emitting Diode (OLED) display, a flexible display or a 3D display.

Figure 5:
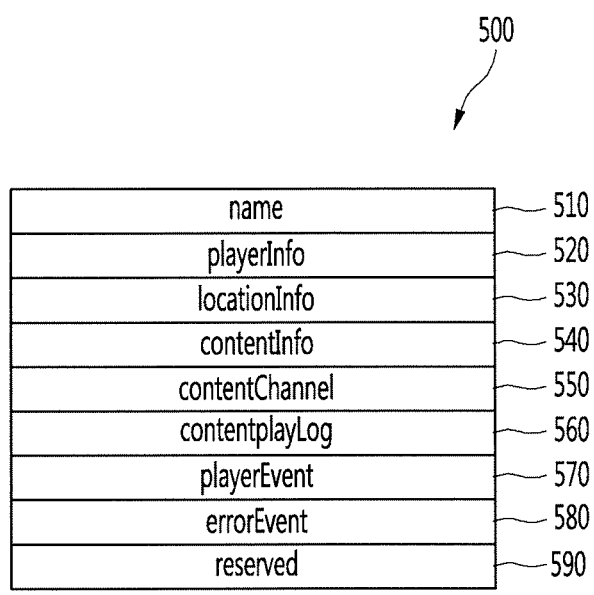
FIG. 5 is a diagram showing an example of the structure of metadata generated by a mobile device according to an embodiment of the present invention.
Figure 6:
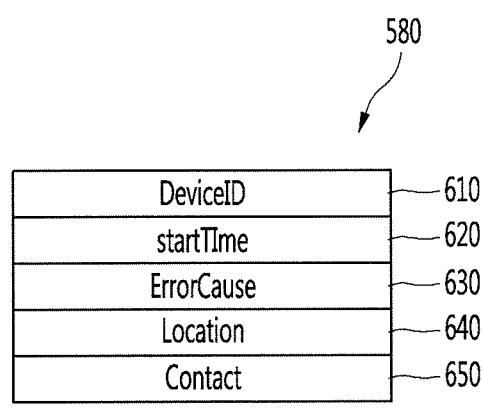
FIG. 6 is a diagram showing an example of a detailed metadata structure of errorEvent of FIG. 5.

Next, FIG. 5 is a diagram showing an example of the structure of metadata according to an embodiment of the present invention, and FIG. 6 is a diagram showing an example of a detailed metadata structure of errorEvent of FIG. 5. Hereinafter, metadata according to an embodiment of the present invention will be described with reference to FIGS. 5 and 6.

Referring to FIG. 5, the metadata 500 is an example of a data format transmitted/received between at least two of a server, a mobile device and a display device. The metadata 500 is predetermined and can be used for processing such as storage, management, playback, etc. of content, control of each device and all processes performed in the digital signage system, such as sharing and processing of error information between devices.

The example of the metadata 500 includes a name element 510 including the name of a player, for device identification, a playerinfo element 520 including basic information of a player, a locationInfo element 530 including the location information of the player, a contentInfo element 540 including basic information of content, a contentChannel element 550 including content transmission/reception channel information, a contentplayLog element 560 including log information related to content playback, a playerEvent element 570 including event information of a player related to content, an errorEvent element 580 including information on an error event related to a network, a device, a player, content, etc. and a reserved element 590 for other data or future use. Further, each of the above-described elements can be used as a superordinate concept and one or more sub-elements including detailed information of the element can be included as a subordinate concept. In the present invention, the errorEvent element can include at least one of the sub-elements shown in FIG. 6, for example.

The format and elements of the metadata 500 shown in FIG. 5 are merely exemplary for convenience of description and better understanding of the present invention and the present invention is not limited thereto. Although some elements of the metadata 500 shown in FIG. 5 are excluded or other elements can be further added. Meanwhile, the metadata including all the elements shown in FIG. 5 may not be necessarily transmitted/received between the devices in the digital signage system and metadata including necessary element(s) can be transmitted/received according to a necessary event.

The reserved element 590 for other data or future use can include content information changed according to target or information on the type of a related product. The reserved element 590 can include change information or frequently modified information to facilitate insertion, change and extension of information.

As described above, if the metadata 500 according to an embodiment of the present invention is used, data indicating which display device executes the generated content (510), which player (hardware type, software type, etc.) operates (520) or a network transmission path (550) can be easily transmitted and received and the server can more efficiently distribute and transmit content. Meanwhile, since it is possible to easily determine whether the terminal actually outputs content using the metadata 560, the metadata can be used for a variety of purposes or usages, such as advertisement effect measurement.

In the present invention, in particular, an error management/processing method of a digital signage system will now be described. Further, FIG. 6 shows the sub-elements of the errorEvent element 580 of the metadata 500 of FIG. 5. The errorEvent element 580 of FIG. 5 serves to define all error events generated in the digital signage system or a process of managing the same and, for example, such error events can be related to a network, a device, a player, content, etc. An error event signal includes an error in displaying the content on the display and an error in receiving the content from a server.

Referring to FIG. 6, the errorEvent element 580 can include a DeviceID sub-element 610 including the identifier of the device for identifying the device in which an error has been generated, a startTime sub-element 620 indicating a time when the error has been generated in the device, an errorCause sub-element 630 which can include all information on error type, cause, etc., a Location sub-element 640 including the location information of the device in which the error has been generated, and a Contact sub-element 650 including information on a manger responsible for the device in which the error has been generated. The error element 580 can further include an ErrorCause sub-element an AdditionalData sub-element capable of transmitting additional information on the error.

In addition, the Contact sub-element 550 can include a plurality of pieces of information on a contact point related to the error, such as the name of the manager of the device, a mobile phone number, an office telephone, an e-mail, a multimedia message service (MMS) transmission information, related link information, etc. Such metadata can be used in various scenarios. Hereinafter, in particular, an example of a scenario of using the metadata related to the error will be described.

When the server transmits a message for checking whether an error is generated to each display device periodically or aperiodically, each display device checks the state thereof to determine whether an error has been generated. When it is determined that an error has not been generated, the display device returns a value corresponding thereto to the server. However, when it is determined that an error has been generated, the display can collect the metadata elements shown in FIG. 6 and transmit the metadata shown in FIG. 5 to the server. The server can parse the metadata and check the cause of the error of each display device using the errorEvent element 580, thereby coping with the error. In the above-described example, the mobile device can function as the server. For example, the manager can check whether an error has been generated in each display device using the mobile device and directly access a display device in which an error has been generated to check the cause of the error. In a similar manner, metadata related to presence/absence of an error can be transmitted between the mobile device, the server and the display device.

Hereinafter, the method of managing/processing the error in the digital signage system according to an embodiment of the present invention will be described in greater detail with reference to FIGS. 1 to 6. As described above, there are various methods of managing/processing an error or various scenarios of using metadata in a digital signage system. Hereinafter, for better understanding of the present invention and convenience of description, in particular, a method of managing/processing an error generated in at least one display device using a mobile device in a digital signage system will be described. Although various UIs or interfaces are shown in this specification, the scope of the present invention is not limited or restricted thereto.

In a method of efficiently managing/processing an error generated in a display device of a digital signage system using a mobile device according to an embodiment of the present invention, for example, information on the error can be automatically transmitted to a manager responsible for the display device, in which the error has been generated, using a predetermined method, such that the error is managed and processed. The information on the error includes, for example, the location of the device in which the error has been generated, the cause of the error, a time when the error has been generated, contact information of the manager, etc. The manager includes, for example, a local manager of the display device, a center manager, or a manager preset according to the cause of the error.

In addition, the predetermined method includes a call, a text message (MMS), an e-mail, etc. Upon transmitting the error information, an interface capable of easily monitoring the state of the device at a glance, such as location information or map information, can also be provided. Any one of the above-described features of the present invention or a combination thereof can be provided.

Hereinafter, in this specification, for better understanding of the present invention, a method of notifying a local manager that an error has been generated in a device and a method of, by a manager, monitoring the state of a device using a CCTV and managing an error will be described. However, the order of such methods is not predetermined and the former and latter methods can be performed in parallel or the order of the methods can be reversed according to use scenario thereof.

FIGS. 7 to 11 are diagrams illustrating an example of a method of notifying a manager that an error has been generated in a device of a digital signage system according to an embodiment of the present invention. Hereinafter, for convenience of description, assume that an error management system of a digital signage system includes one server, at least one mobile device and a plurality of display devices.

The mobile device can be any one of a portable phone, a smartphone, a tablet PC and a system dedicated device and can be linked to at least one display device. The mobile device preferably pre-registers information on a link with at least one of a server and a display device and unique information of the mobile device. The link information refers to information indicating that, for example, when there are devices 1 to 10, devices 1 to 5 are linked to a mobile device 1 and devices 6 to 10 are linked to a mobile device 2. Link means that the display device is managed/controlled by the mobile device and can mean that data transmission and reception and data processing are possible based on identifier information of the registered devices. Further, the metadata and the error related data shown in FIGS. 5 and 6 can be included as transmitted/received data. In addition, the unique information includes, for example, the identification information of the mobile device, network information for communication with the linked display device or the server, etc. The mobile device can pre-register information necessary to transmit and receive data, such as identifier information, network information, etc., with at least one of the server and the linked display device, as described above.

The mobile device can pre-download and use a widget application in order to manage and/or control the linked display device in the digital signage system. Upon determining that the error is generated as the result of collecting the state information thereof, the display device transmits the metadata including the information shown in FIGS. 5 to 6 to the mobile device. In addition, the mobile device parses the metadata received from the display device and generates and provides a UI shown in FIG. 7 on a screen.

In the above description, the display device directly transmits data to the linked mobile device without passing the data through the server. Meanwhile, in addition to the above-described message transmission method, the display device can collect and transmit an error related message to the server and the server can generate the metadata shown in FIGS. 5 and 6 and transmit the generated metadata to the mobile device based on information on a link with the pre-registered display device to transmit an error message. In addition, when the server or the display device transmits the error message, another communication server can be used in addition to the above-described server.

Whether the error has been generated in the display device can be determined autonomously or according to a request of the mobile device or the server. In addition, whether the error has been generated can be determined periodically or aperiodically. For example, the server or the mobile device can transmit a message or packet for requesting to check whether an error has been generated at a predetermined period using a polling method and the display device can check whether an error has been generated in correspondence with the request message or packet and transmit a message or packet including the checked result in response thereto.

Figure 7:
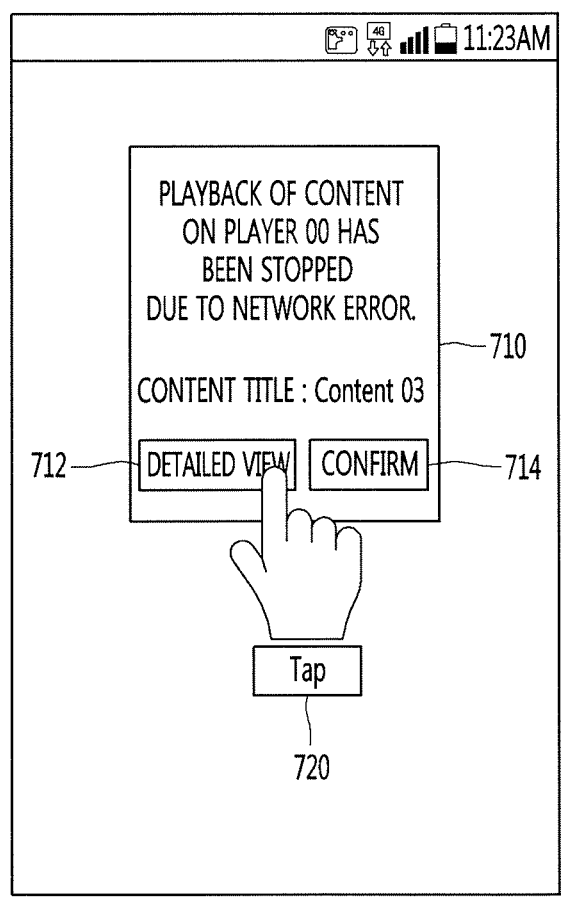
FIGS. 7 to 11 are diagrams illustrating an example of a method of notifying a manager that an error is generated in a device of a digital signage system according to an embodiment of the present invention.

Referring to FIG. 7, the local manager can acquire a display device in which the error has been generated, information on the name of content which has been executed on the display device and information on the cause of the error from the error message UI 710 provided on the screen of the mobile device. Further, the error message UI can include a detailed view button 712 for requesting detailed information of the error and a confirmation button 714 indicating that the error message has been confirmed.

Figure 8:
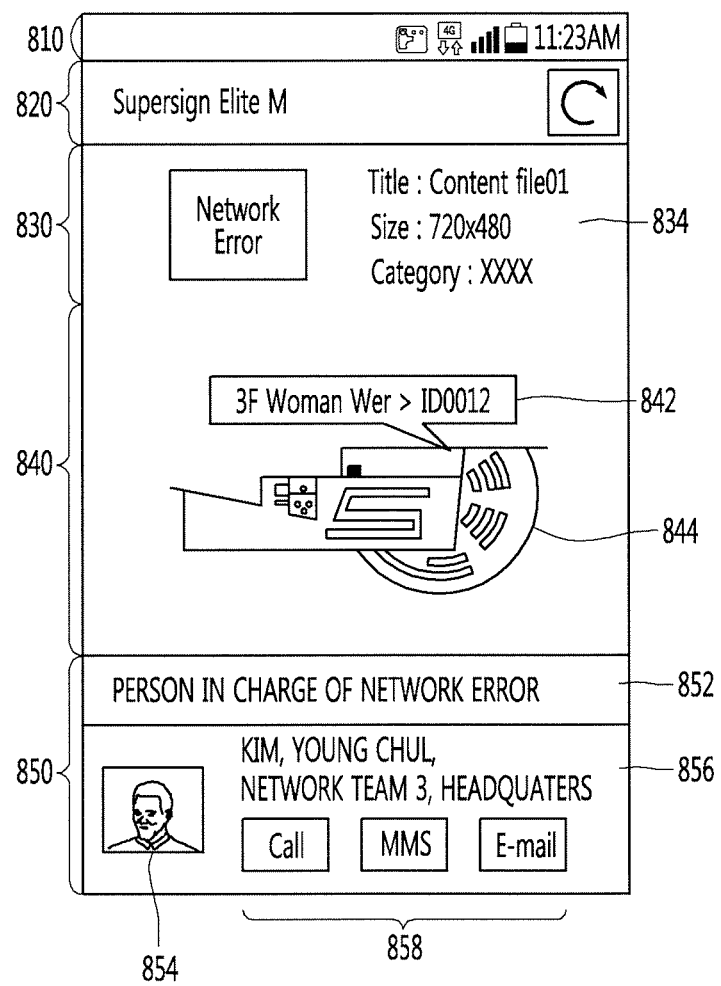

For example, when the local manager presses or selects the detailed view button 712 using a tap icon 720 as shown in FIG. 7, the mobile device can check selection of the local manager and then provide the UI of FIG. 8 including more detailed information as compared to FIG. 7 on the screen in response thereto. Referring to FIG. 8, the UI provided on the screen of the mobile device can include more detailed information as compared to FIG. 7, e.g., a plurality of regions for providing a screenshot for an error image, error state details, location information of the device, person-in-charge information, etc.

A first region 810 refers to a region in which information on the mobile device is provided and can include icons indicating a communication state of the mobile device, a communication mode, a cable connection state, a remaining battery charge, a time, etc. A second region 820 can output title or category information for identifying a screen provided on the mobile device. For example, the information provided on the screen of the mobile device can indicate a screen according to execution of a widget application of a digital signage system. A refresh button can be provided in a predetermined portion of the second region 820 to request re-execution according to change, modification, update or error of information.

A third region 830 is a screen region in which detailed information according to selection of the detailed view button 712 of FIG. 7 is output and can provide information 834 on the cause of the error, the title of content executed in the device, a category, resolution, etc. A fourth region 840 is a screen region in which detailed information according to selection of the detailed view button 712 of FIG. 7 is output, and particularly provides information 842 related to the location of the display device. In this instance, the information related to the location of the display device can be provided, for example, in the form of a graphical image or map (844). In the provided graphical image or map 844, identifier information capable of identifying the display device, e.g., information '3F Women Wear>ID0012' of FIG. 8, can be provided, such that the manager can easily check that an error has been generated in a device having an ID of 0012 and located at a women's wear department.

The mobile device can request, receive and provide information on a route or shortest route from the current location of the manager or the mobile device to the display device, in which the error has been generated, from the server using the location information of the GPS, the CCTV, etc. in addition to provision of the graphical image or map (hereinafter, map) 844 of FIG. 8. In this instance, the mobile device can continuously communicate with the server to continuously provide a movement route between the current location of the mobile device and a destination, that is, the display device, in which the error has been generated, thereby increasing convenience of the manager. In addition, the map information provided in the fourth region 840 can be enlarged or reduced by arbitrary selection of a user as necessary and can be provided in various forms such as highlight, color change, flickering, etc., in order for the user to conveniently recognize the display device.

A fifth region 850 is a screen region in which detailed information according to selection of the detailed view button 712 of FIG. 7 is output, and provides information on the manager related to the error. In FIG. 8, information 852 identifying the person in charge of the error, image information 854 of the person in charge of the error, information 856 on the department and position of the manager, a contact button 858 for contacting the person in charge, etc. are provided The contact button 858 can include a call button for telephone communication, an MMS button for delivery of a text message, an e-mail button for transmission of an e-mail, etc.

In addition, the person in charge of the error can be a server manager or a person in charge pre-registered according to the cause of the error in the digital signage system. The local manager can check the information of FIGS. 7 and 8 through the screen of the mobile device to recognize that the error has been generated in a predetermined display device. In this instance, when the local manager checks the error, it is possible to take early measures in order to solve a problem caused due to the error. Examples in which the local manager takes measures include placing a call to the person in charge of the error or transmission of an MMS or an e-mail to the person in charge of the error.

Figure 9:
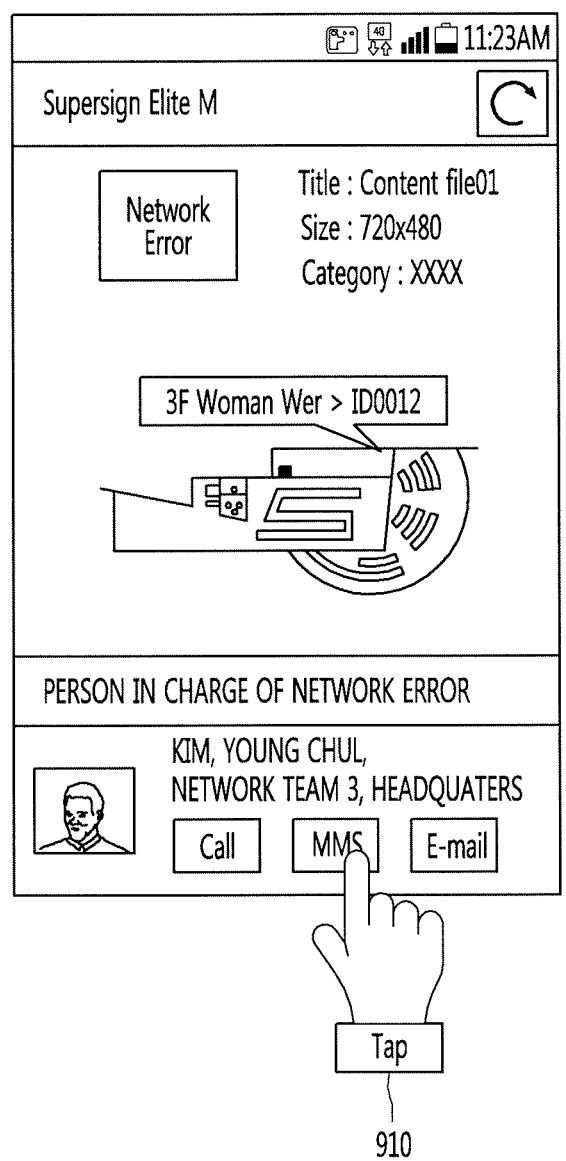
Figure 10:
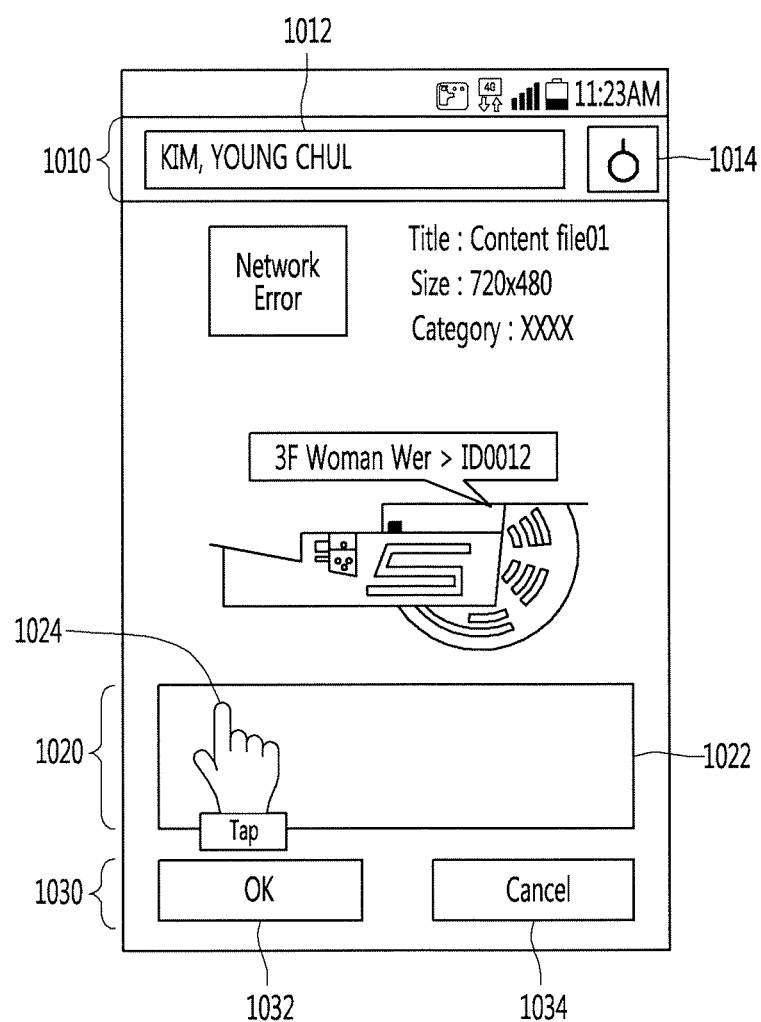
Figure 11:
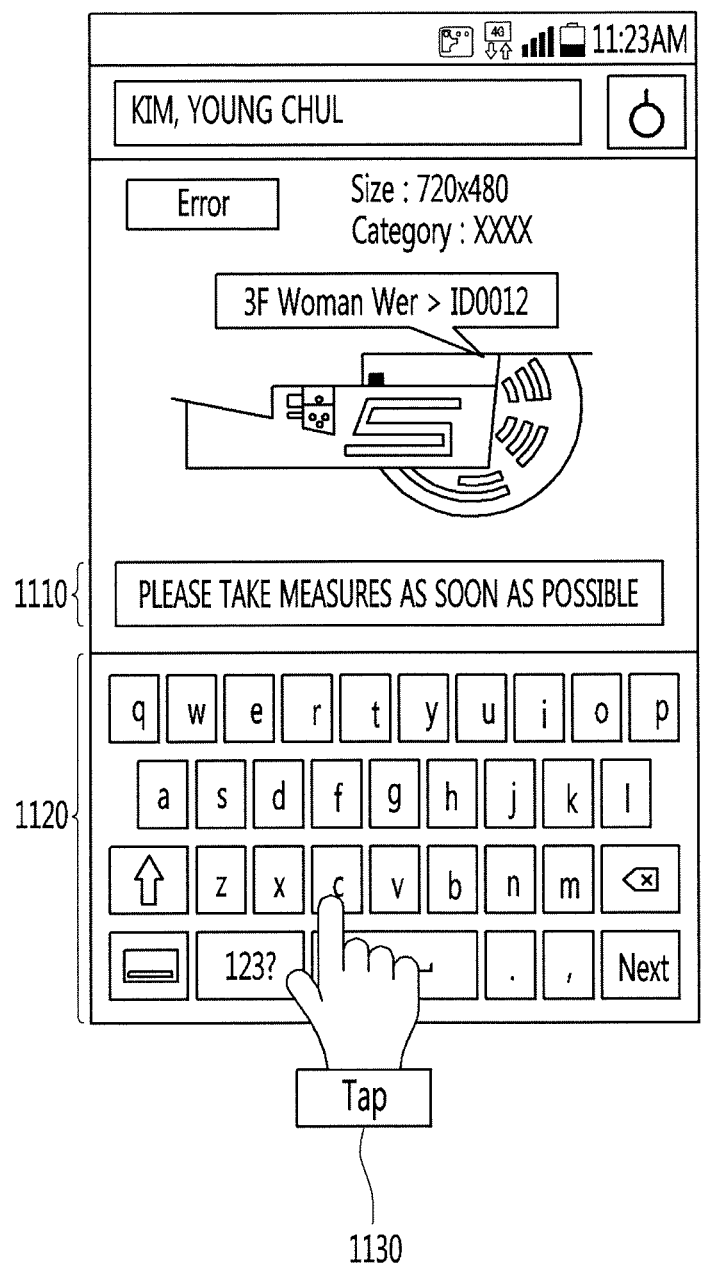

Referring to FIGS. 9 to 11, upon checking detailed information of the error as shown in FIG. 8, the local manager transmits an MMS message to the person in charge of the error. In this instance, the local manager selects an MMS using the tap button 910, as shown in FIG. 9. When the local manager transmits the MMS message to the person in charge of the error as shown in FIG. 9, a window 1022 for writing a message to be transmitted to the person in charge of the error is provided in a predetermined region on the screen of the mobile device, as shown in FIG. 10. In addition, when the local manager locates the tap icon 1024 in the window 1022 in order to write the message, as shown in FIG. 10, a way for inputting the message is provided in a predetermined region 1120 of the screen. For example, a vertical keyboard may be provided under the window 1110.

Accordingly, when the provided window 1110 is accessed to provide the message input 1120 as shown in FIG. 11, the local manager can write a desired message ("Please take measures as soon as possible") using the tap icon 1130 and transmit the message to the person in charge of the error through an enter button. Referring to FIG. 11, the mobile device can output information on a person, to whom a message written in the upper end of the screen is transmitted when the local manager writes the message, thereby increasing convenience of the local manager. In the above description, the method of, at the mobile device, checking the error of the digital signage system and transmitting information to the person in charge of the error in order to early correct the error has been described.

Next, a method of enabling an owner of a mobile device, that is, a local manager, to easily and conveniently check the state of a display device of a digital signage system using a CCTV and to easily and conveniently manage an error will be described as a process before or after the above-described method or separately from the above-described method.

In particular, FIGS. 12 to 16 are diagrams illustrating another example of a method of notifying a manager that an error has been generated in a device of a digital signage system according to an embodiment of the present invention. The mobile device is smaller than a fixed display device because the mobile device is portable. Meanwhile, if a plurality of areas or a plurality of display devices is present in an area managed by a local manager, it is difficult to output information on all the areas or the display devices on the screen of the mobile device. In this instance, the mobile device can divide the areas or the display devices into a predetermined number of groups to solve the disadvantages of the mobile device. For example, hereinafter, the areas or the display devices are defined in predetermined units, e.g., layer units. The layers can be subdivided for easy identification by a user.

Figure 12:
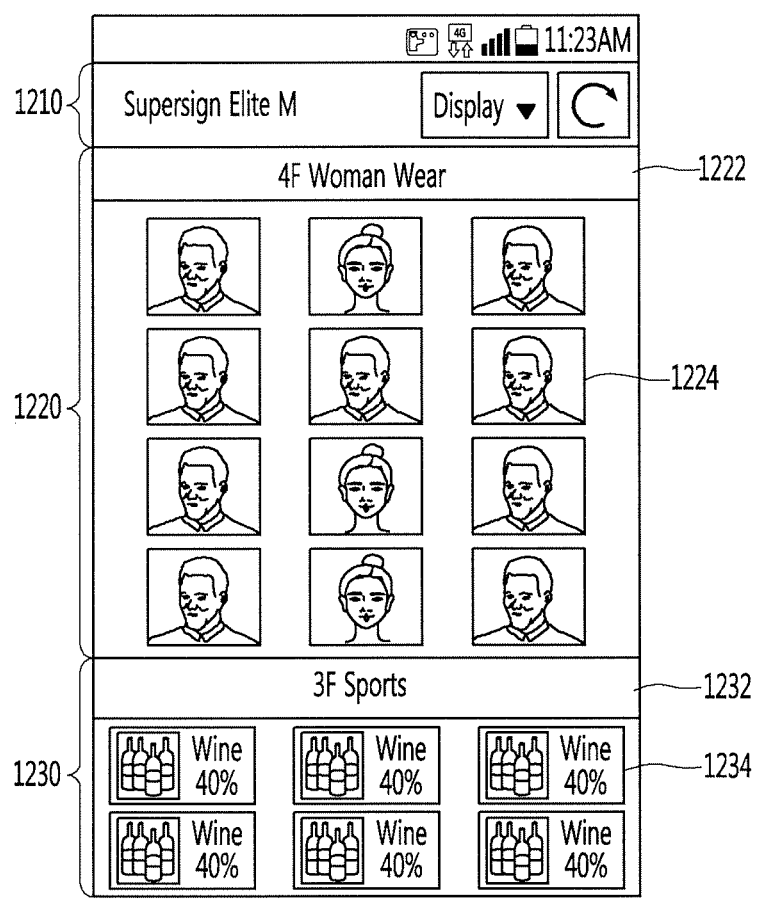
FIGS. 12 to 16 are diagrams illustrating another example of a method of notifying a manager that an error is generated in a device of a digital signage system according to an embodiment of the present invention.

In FIG. 12, a variety of information can be provided as shown in FIGS. 8 to 11. Further, for convenience of description, a portion in which information is provided can be referred to as a region. A first region is an uppermost region of a screen, in which related information is not provided but basic information of the mobile device is provided.

In a second region 1210, title information for identifying the widget application is provided, and a selection window and a refresh button can be included. The selection window serves to provide convenience of selection of related information such as convenience of layer selection of the local manager or convenience of selection of the display device, for example. In addition, the refresh button can be provided to return to a previous screen or to perform a refresh function for real-time update.

A third region 1220 is a main region in which a layer (in FIG. 12, women's wear department of the fourth floor) selected by the selection window of the second region 1210 and a text message for identifying the same are provided (1222), and a UI 1224 for the display device mounted in the corresponding layer is provided. In this instance, if an available space remains in the screen of the mobile device or according to settings, a fourth region 1230 can be further provided.

The fourth region 1230 can include, for example, UIs 1232 and 1234 for the layer of the third region and a layer adjacent thereto or an information region or a function key region for the third region 1220, as shown in FIG. 12. In addition, the mobile device can include a touchscreen. Upon up, down, right or left movement of the third region 1220 or the fourth region 1230 according to user selection, information on the layer can be provided.

The screen displaying the display devices of the third region 1220 shown in FIG. 12 can show image data or video data, for example, captured images or screenshots of the currently output screens received from the display devices according to a user request as shown in FIG. 12. In FIG. 12, if a predetermined display device does not provide content without an error, the screen of the display device is replaced with a black screen or a predetermined image or text capable of indicating that content is not currently provided can be provided. In this instance, the mobile device can control the display device directly or indirectly through the server to provide content according to selection of the local manager, because, if the UI provides a black screen, the local manager can misinterpret the black screen as an error.

Figure 13:
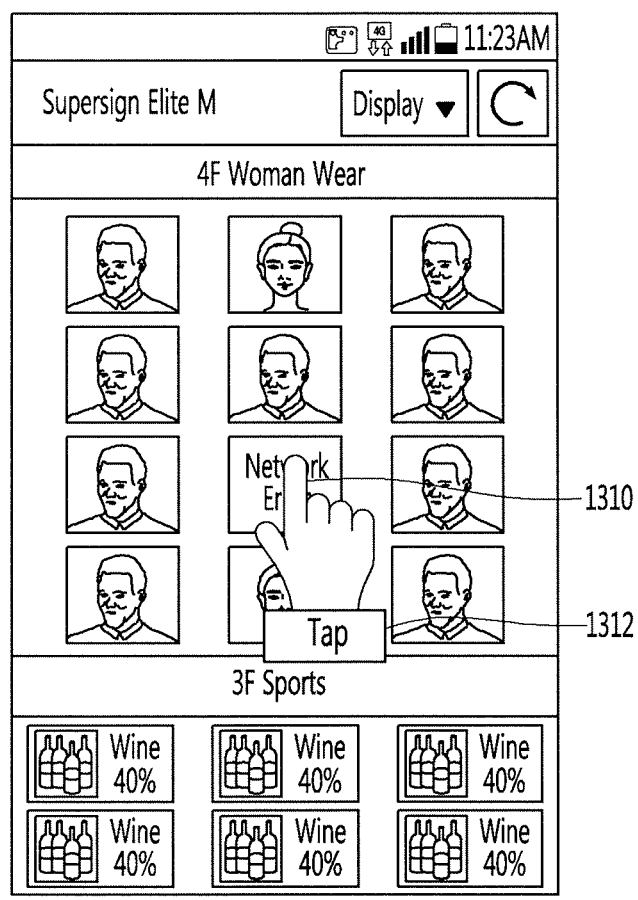
Figure 14:
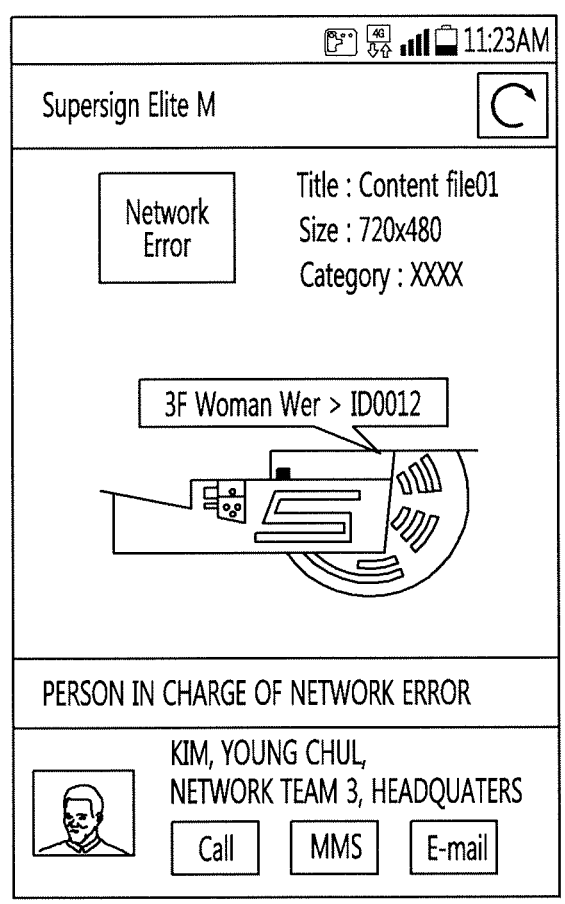
Figure 15:
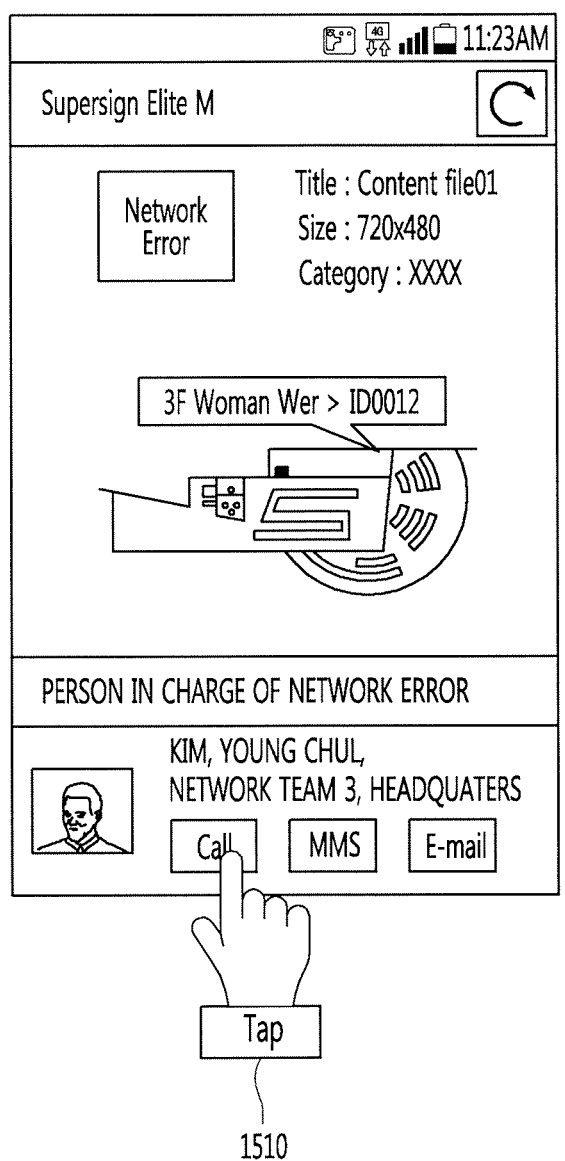

FIG. 13 shows a screen UI 1310 when an error has been generated in a predetermined display device of the women's wear department of the fourth floor. In this instance, the mobile device receives the metadata shown in FIGS. 5 to 6 from the display device or the server, checks the received metadata, and configures and provides the screen shown in FIG. 13 to the local manager. As shown in FIG. 13, when the local manager clicks or selects the screen 1310 using the tap icon 1312, the mobile device can provide the screen UI of FIG. 14. For example, in FIG. 14, the screen is configured using the same method as FIG. 8. FIGS. 8 and 14 are different except that a display device in which an error has been generated is checked and detailed information thereof is provided. Of course, the configuration of the screen can be different from that of FIG. 8. In FIG. 15, the screen is configured using the same method as FIG. 9. Accordingly, for detailed description of FIGS. 14 and 15, refer to the description of FIGS. 8 and 9.

Figure 16:
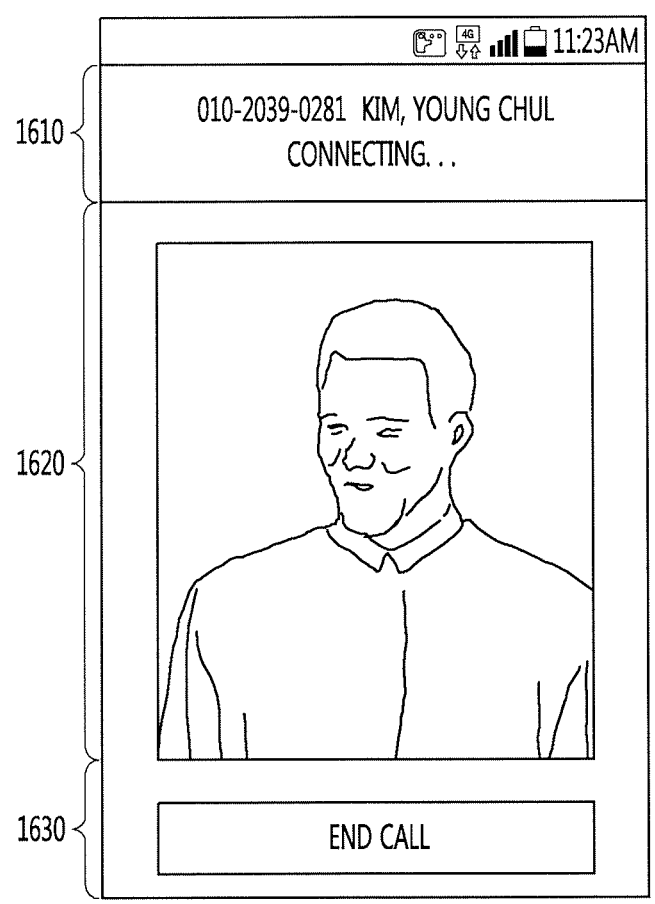

When the user places a call to the person in charge of the error using the tap button 1510 on the screen of FIG. 15, the mobile device can configure and provide the screen shown in FIG. 16 and provide supplementary information. For example, in FIG. 16, information on the contact and name of the person in charge of the error and information indicating that a telephone call is being connected are displayed in a first region 1610 and the photo of the person in charge can be displayed in a second region 1620. In this instance, if the photo of the person in charge is not pre-registered, an alternative image can be provided. In a third region 1630, a function key is provided. The function key can be a key for ending a call. Alternatively, various function keys necessary to connect the telephone call can be included in addition to the key for ending the call shown in FIG. 6.

The example of a method of controlling a digital signage system using a mobile device according to an embodiment of the present invention can include downloading and installing a first application for managing/processing an error, making a request for checking whether an error has been generated from a display device through the first application and receiving a response thereto, generating and outputting an error display user interface (UI) on a screen according to the response, and managing and processing the error using the error display UI.

The control method can further include performing cross-authentication with at least one of a server for controlling the digital signage system and the display device linked to the mobile device through the first application and registering at least one of the cross-authenticated server and display device. The control method can also include checking a network connection state and requesting the first application from the Web or the server through a connected network. In addition, the control method can further include requesting a second application for managing the system from the Web or the server and downloading and installing the second application, monitoring the state of the display device through the second application, marking a display device in which an error has been generated as the monitored result, and outputting detailed information of the generated error of the identified display device.

The detailed information of the error can include at least one of the screenshot of the error state of the display device, error state details, a contact point for processing the error state, and link information. In addition, the request and the response can be transmitted and received in the form of a message or packet and the message or the packet can include metadata for the request and the response. The metadata can include an errorEvent element including error event information related to the network, the display device, the player and the content. The metadata can further include a name element including the name or identifier for identifying a player, a playerinfo element including basic information of the player, a locationInfo element including location information of the player, a contentInfo element including basic information of content, a contentChannel element including transmission/reception channel information of the content, a contentplayLog element including log information related to content playback, a playerEvent element including event information of a player related to the content and a reserved element for other information or future use. In addition, the errorEvent element can include at least one sub-element related to identifier information of a display device in which an error has been generated, information on a time when the error has been generated, information on a cause of the error, the location information of the display device and contact point information according to the information on the cause of the error.

The control method can further include outputting information corresponding to the cause of the error of the display device, searching for or refreshing an available network, switching to an alternative network, checking the output state of the display device according to the switched alternative network, and managing/processing an error.

Figure 17:
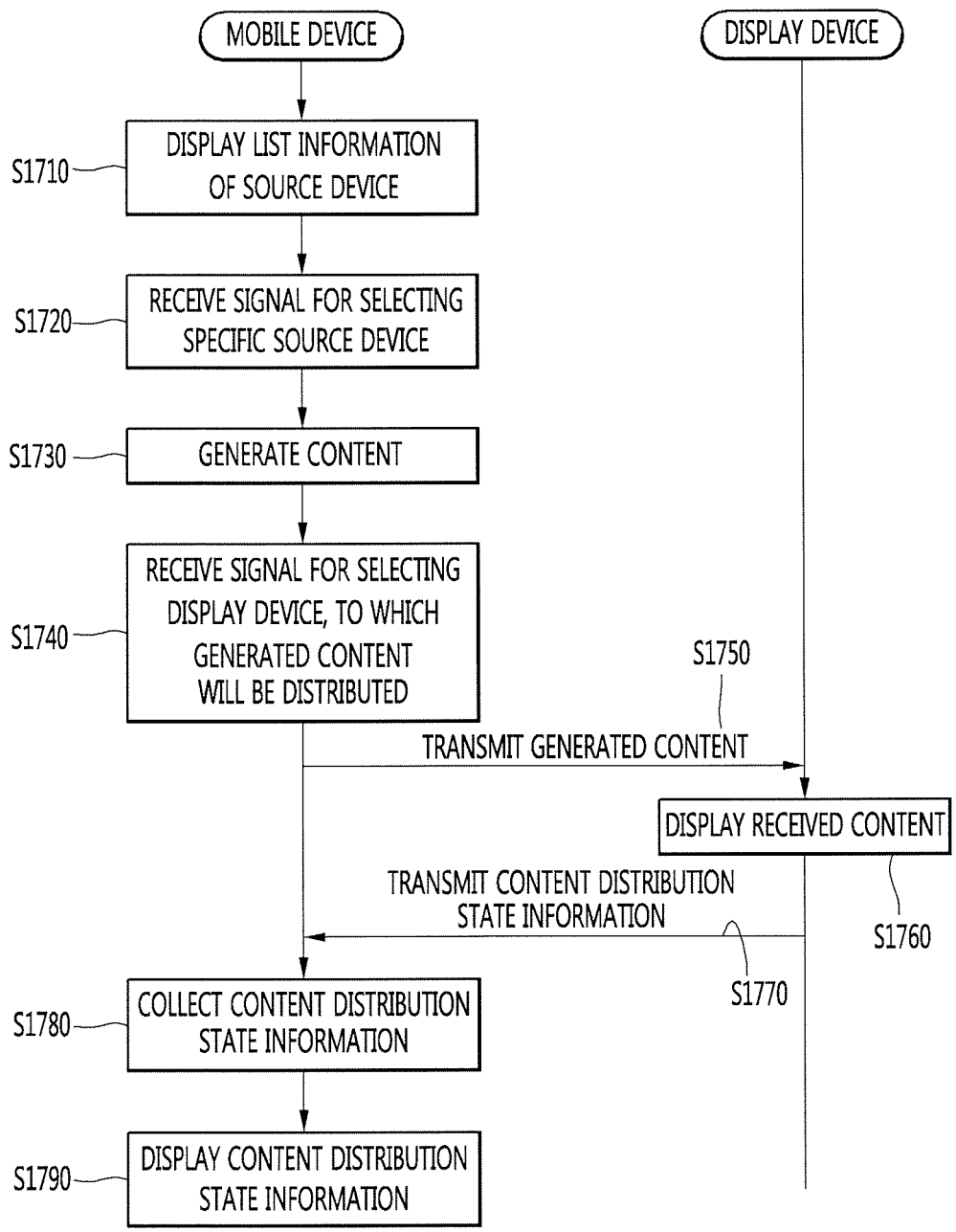
FIG. 17 is a flowchart illustrating a data transport protocol between a mobile device and a display device according to an embodiment of the present invention.

Next, FIG. 17 is a flowchart showing a data transport protocol between a mobile device and a display device according to an embodiment of the present invention. The mobile device outputs list information of a source device (S1710). The source device can provide content and include a central server of the digital signage system and the mobile device.

A signal for selecting a specific source device of the list information of the source device is received from the user (S1720) and content is generated if the selected specific source device is the mobile device (S1730). The content can use photos, videos, image files, etc. stored in the mobile device. The content can be generated by adding and editing text, etc. and can have various data formats to be displayed on the display device.

A signal for selecting a display device, to which the generated content will be distributed, is received from the user (S1740). The content can be distributed to a plurality of display devices. In this instance, each display device or a group including a plurality of display devices can be selected.

When the display device, to which the content will be distributed, is selected, the generated content is transmitted to the selected display device (S1750). The display device, which has received the content, displays the received content (S1760). The content, the metadata of the content and the received information can be stored in another memory. Using the stored data, content distribution state information can be transmitted to the mobile device (S1770). The distribution state information can include whether transmission is finished, when transmission is finished, etc.

The mobile device can collect the content distribution state information of the plurality of display devices using the content distribution state information received from the display device (S1780). The collected information can be reference data used to measure advertisement effects or set a future content distribution schedule. In addition, the distribution state information can be output from the mobile device according to a user request (S1790).

Figure 18:
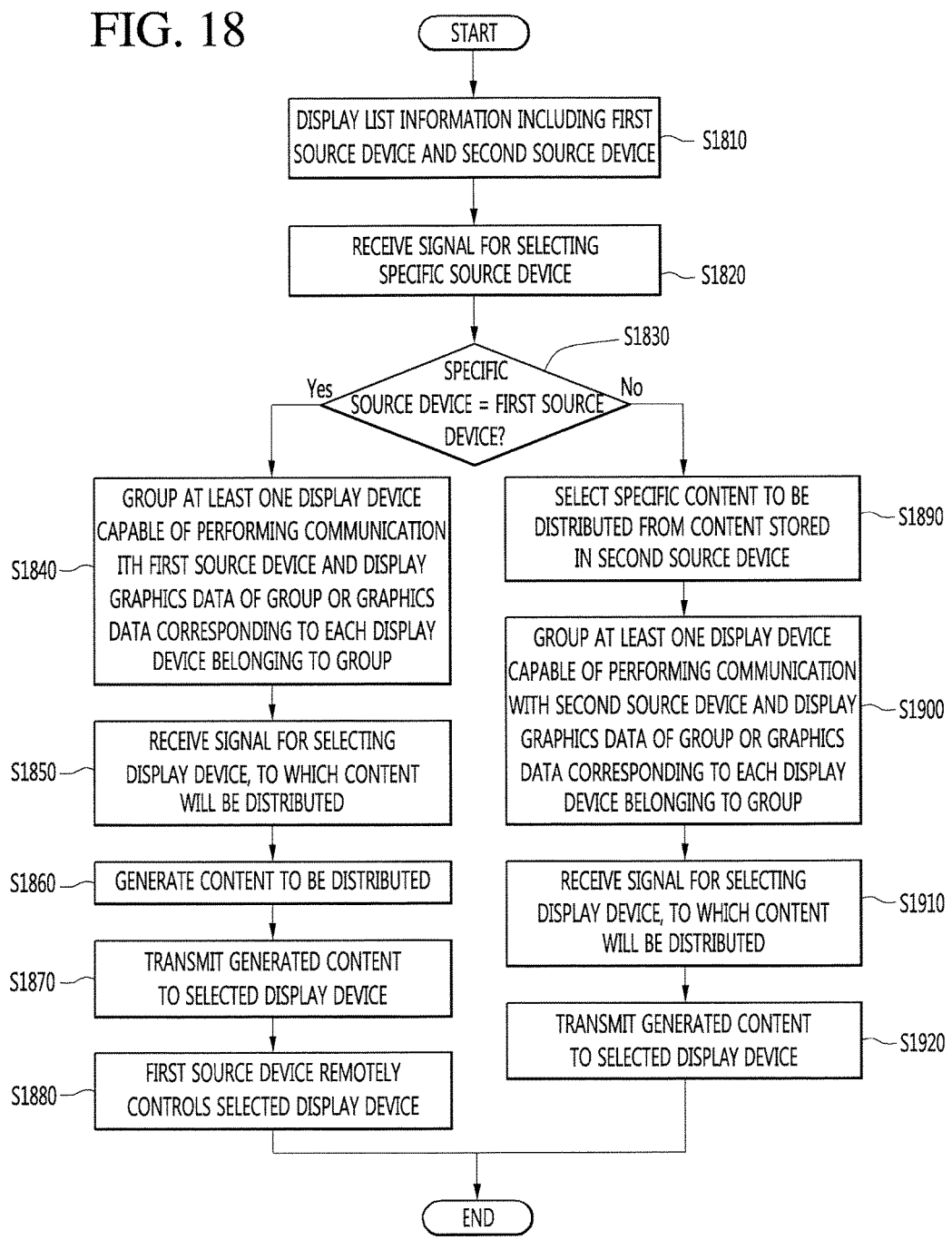
FIG. 18 is a flowchart illustrating a method of controlling a mobile device according to an embodiment of the present invention.

FIG. 18 is a flowchart illustrating a method of controlling a mobile device according to an embodiment of the present invention. The method of controlling the mobile device according to the embodiment will be described with reference to FIG. 18. A detailed description of the same portions as the system for distributing the content from the mobile device to the display device will be omitted.

First, list information including a first source device and a second source device is output (S1810). A plurality of source devices can provide content, the first source device can be a mobile device and the second source device can be a central server of a digital signage system.

A signal for selecting a specific source device is received from a user through a user interface of the mobile device (S1820). Which source device is selected is determined (S1830). If the specific source device is a first source device (Yes in S1830), at least one display device capable of performing communication with the first source device is grouped and graphics data of the group or graphics data corresponding to each of the display devices belonging to the group is output (S1840). Outputting the graphics data of the group or each display device is within the scope of the present invention.

When the user receives the signal for selecting the group or each of the display devices belonging to the group using the graphics data (S1850), content to be distributed to the selected display device is generated (S1860). The content can be generated using at least one of photos, images, music, videos and text and the user interface and the display of the mobile device can provide a convenient tool for enabling the user to easily and conveniently generate the content. Further, step S1860 can be performed after or before steps S1840 and S1850. The order of steps is not limited thereto.

The generated content is transmitted to the selected display device (S1870). The first source device, that is, the mobile device, can conveniently generate and transmit the content, thereby generating and displaying the content in real time and rapidly coping with the state of the place where the display device is mounted. In addition, the display device can be controlled using the first source device without a remote controller after the content generated by the first source device is transmitted to the display device, thereby increasing user convenience.

When the user requests remote control of the selected display device through the user interface of the first source device, the mode of the first source device is changed to a remote control mode. If the mode is changed, a control signal can be wirelessly transmitted to the selected display device according to a predetermined protocol such that the first source device remotely controls the display device (S1880).

If the specific source device is not the first source device (No in S1830), the specific source device can be the central server of the digital signage system, that is, the second source device. Accordingly, specific content to be distributed is selected from the content stored in the second source device (S1890). Of course, new content can be requested from the central server to select newly generated content.

At least one display device capable of performing communication with the second source device is grouped and the graphic data of the group or the graphic data corresponding to each of the display devices belonging to the group is displayed (S1900). Using the graphic data, a signal for selecting at least one display device, to which the selected content will be distributed, is received from the user (S1910).

The selected content is transmitted to the selected display device (S1920). Further, a transmission request signal can be transmitted to the central server so as to directly transmit the content from the central server to the display device or the mobile device can receive the content from the central server and directly transmit the content to the display device.

Further, the mobile device can receive the information on the state of distributing the content to at least one display device from the central server or the at least one display device. The mobile device can generate the graphics data using the received distribution information and output the generated graphics data. By providing the content distribution state information to the user, it is possible to easily check the distribution state using the mobile device and to rapidly cope with a situation in which the content is not smoothly distributed.

Although the embodiments are individually described with reference to the figures for convenience of description, the embodiments can be combined to implement a new embodiment. According to the needs of those skilled in the art, a computer-readable recording medium having a program for executing the above-described embodiments recorded therein is within the scope of the present invention.

The mobile device and the method of controlling the same according to an embodiment of the present invention are not limited to configurations and methods of the above-described embodiments, and all or some of the embodiments can be selectively combined with one another to achieve various alterations.

Figure 19:
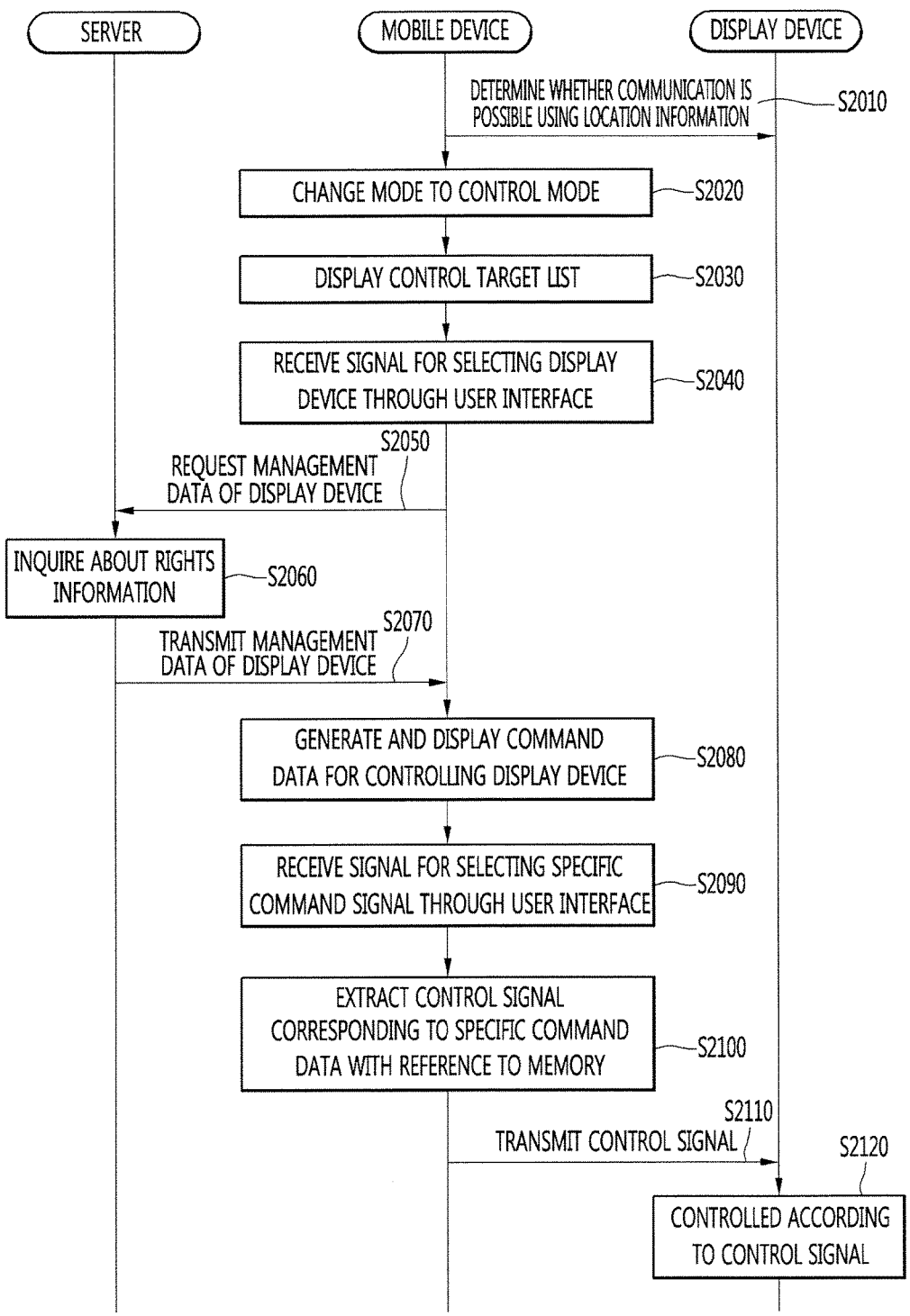
FIG. 19 is a flowchart showing a data transport protocol among a server, a mobile device and a display device according to an embodiment of the present invention.

FIG. 19 is a flowchart showing a data transport protocol among a server, a mobile device and a display device according to an embodiment of the present invention.

The mobile device searches for a communication-capable display device using location information at a predetermined time interval (S2010). If a communication-capable display device is searched for, the mode is changed to a control mode (S2020) and a control target list is output (S2030). When there is a communication-capable display device, the mode is automatically changed to a control mode, such that a control target list is automatically output when a controllable display device is approached. Therefore, it is possible to increase user convenience.

A signal for selecting a display device from among at least one controlled object included in the control target list is received from the user through the user interface (S2040). If command data of the display device is not stored in the mobile device, management data of the display device is requested from the server (S2050).

The server inquires about rights information of the manager of the mobile device (S2060) and transmits the management data of the display device (S2070) if the manager has the right to manage the display device. If the manager does not have the right to manage the display device, whether the right is granted to the manager or not can be determined, the right can be granted and then the management data can be transmitted.

The management data is stored in and managed by the server and can include at least one of identification information and state information of the display device, content information to be transmitted to and executed by the display device, schedule information and information indicating whether content is transmitted. The mobile device, which has received the management data from the server, generates and outputs command data for controlling the display device (S2080). The command data includes information for controlling the display device and graphics data of a control menu to be selected by the user. Accordingly, the number of pieces of command data can be at least one.

When the signal for selecting specific command data is received through the user interface (S2090), a control signal corresponding to the specific command data is extracted from the memory (S2100). The control signal is wirelessly transmitted to the display device according to a predetermined protocol (S2110) and the display device is controlled according to the control signal (S2120).

The predetermined protocol is used to transmit and receive a signal through a wireless communication network and can use optical communication, infrared communication, etc. According to the protocol, the controller of the mobile device can convert command data into a control signal suitable for the protocol and transmit the control signal to the communication unit.

Figure 20:
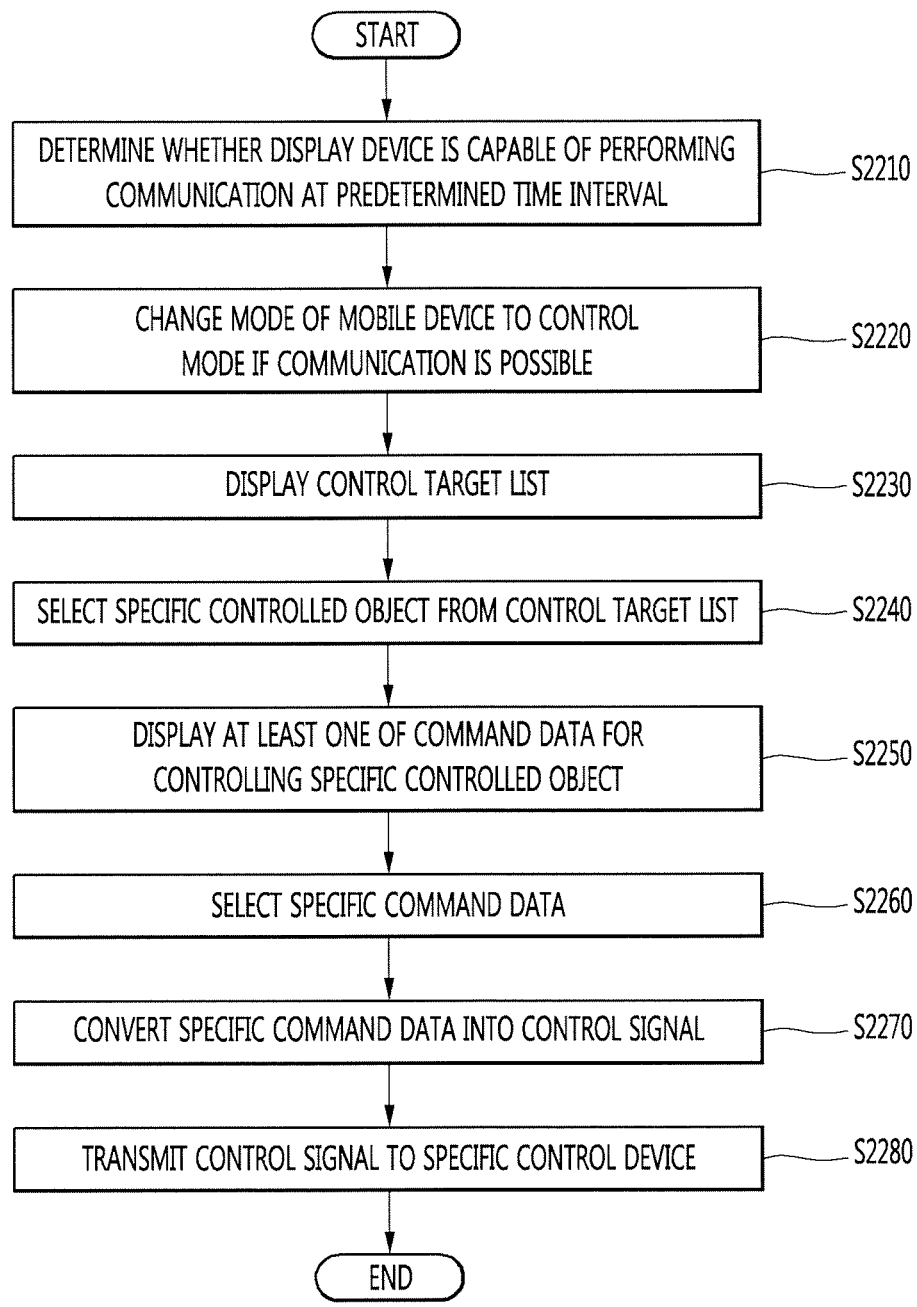
FIG. 20 is a flowchart illustrating a method of controlling a mobile device according to an embodiment of the present invention.

FIG. 20 is a flowchart illustrating a method of controlling a mobile device according to an embodiment of the present invention. The detailed description of the same portions as the above-described mobile device will be omitted.

Whether the display device is capable of performing communication is determined at a predetermined time interval (S2210). Further, whether the display device is capable of performing communication can be determined using the location information of the display device. The location information can include at least one of an Internet protocol (IP) address, a MAC address and a global positioning system (GPS) address.

For example, a plurality of IP addresses, MAC addresses, etc. can be stored and the plurality of IP addresses, MAC addresses, etc. can be attempted to be sequentially accessed at a predetermined time interval to determine whether communication is possible. In addition, whether a display device capable of performing communication is present within a short distance can be determined if the mobile device is located at a pre-stored GPS position.

Determining whether a communication-capable display device is present through a short-range communication network such as Bluetooth is within the scope of the present invention. If communication is possible, the mode of the mobile device is changed to a control mode (S2220). A notification message can be displayed to notify the user of the changed mode.

If the mode is changed to the control mode, a control target list including at least one of a communication-capable display device, content capable of being displayed on the display device and a content distribution device for transmitting content to the display device is output (S2230). When a signal for selecting (S2240) a specific controlled object from the control target list is received through the user interface (S2250), at least one piece of command data for controlling the specific controlled object is output (S2260).

The command data includes information for controlling the controlled object and graphics data of a menu for controlling the controlled object. In addition, if the specific controlled object is a display device, graphics data corresponding to at least one of a selection command of a content distribution device for transmitting content to the display device, a power control command of the display device, a volume control command of the display device and a playback control command of content displayed on the display device can be generated and output.

In addition, if the specific controlled object is a content distribution device, graphics data corresponding to at least one of a power control command of the content distribution device, a selection command of content to be distributed by the content distribution device, a command for distributing content from the content distribution device to the display device and a command for selecting a display device, to which content will be transmitted can be generated and displayed.

In addition, if the specific controlled object is content, a player for playing back the content can be controlled, and graphics data corresponding to at least one of a content playback control command, a content list selection command, a specific content selection command and a specific content deletion command can be generated and output.

Further, in order to generate the command data, the mobile device can request management data of the specific controlled object from the server and generate the command data using the management data. The management data is stored in and managed by the server and can include at least one of identification information and state information of the display device, content information to be transmitted to and executed by the display device, schedule information and information indicating whether content is transmitted.

In addition, the server can be inquired about rights information to determine whether there is right to control the specific controlled object. If there is no right to control the specific controlled object, the server can grant the right to control the specific controlled object. If the memory of the mobile device has a residual space, a controlled object, command data of each controlled object, graphics data corresponding to the command, etc. can be stored and the command data can be output from the memory as necessary.

When a signal for selecting specific command data from at least one piece of command data is selected through the user interface (S2260), the specific command data is converted into a control signal (S2270). For conversion into the control signal, a predetermined protocol for matching between the command data and the control signal can be used.

The command data and the control signal corresponding to the command data can be stored in the memory and the control signal corresponding to specific command data can be extracted. In this instance, there is a need for a process of separately storing the control signal corresponding to the command data in the memory according to the controlled object. The control signal is transmitted to the specific controlled object (S2280). Therefore, the mobile device can control the display device, the content distribution device or the content, such that the user, that is, the manager, can conveniently and rapidly perform local management.

According to an embodiment of the present invention, by providing an interactional digital signage system, an advertiser, an advertisement creator and an advertisement content user can all be satisfied. The advertiser can directly participate in the process of creating and controlling the advertisement to generate content suitable for the intention thereof and increase satisfaction and purchase desires of users to maximize advertisement effects. In addition, the user can easily access the advertisement content output through the display device of the interactional digital signage system to easily and conveniently acquire desired information. It is possible to more easily and efficiently manage the digital signage system and, more particularly, to manage/process errors or malfunction in real time and to minimize a concomitant phenomenon.

Although the embodiments are individually described with reference to the figures for convenience of description, the embodiments can be combined to implement a new embodiment. According to the needs of those skilled in the art, computer-readable recording medium having a program for executing the above-described embodiments recorded therein is within the scope of the present invention.

Figure 21:
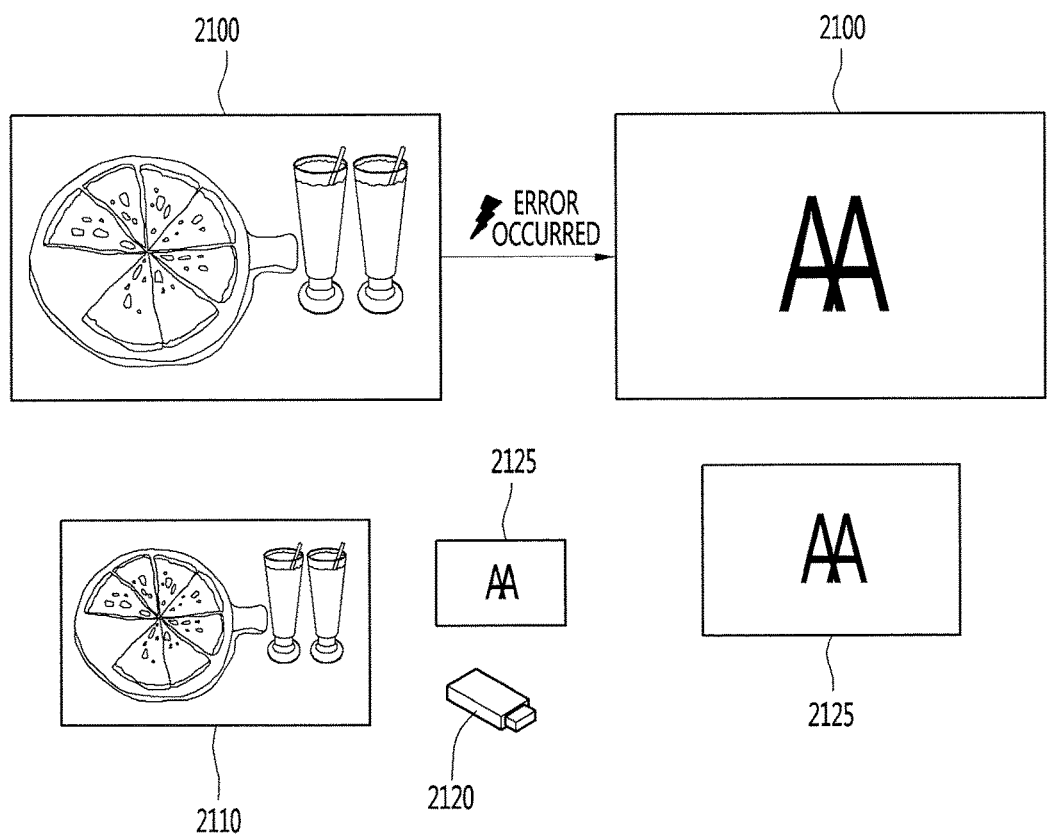
FIGS. 21 and 22 include a diagram and a flowchart illustrating an example in which a digital signage according to an embodiment of the present invention displays a pre-stored backup image when an error event is generated.
Figure 22:
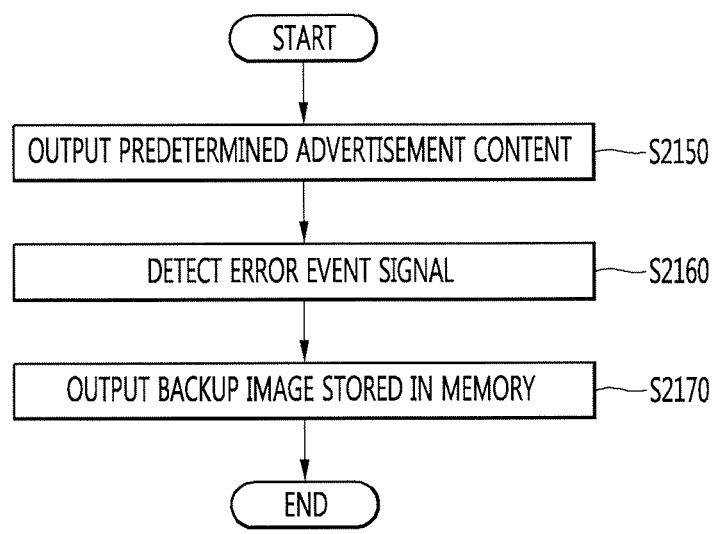

Hereinafter, another embodiment of processing an error event in a signage without using a mobile device will be described. In particular, FIGS. 21 and 22 are diagrams illustrating an example in which a digital signage according to an embodiment of the present invention displays a pre-stored backup image when an error event is generated.

A digital signage 2100 according to the embodiment of the present invention can output predetermined advertisement content 2110 at a predetermined period (S2150). The advertisement content and the output period can be set by a user. The digital signage 2100 according to the embodiment of the present invention can store a backup image 2125 corresponding to an error event signal in a memory. The memory can be an internal or external memory 2120.

Figure 23:
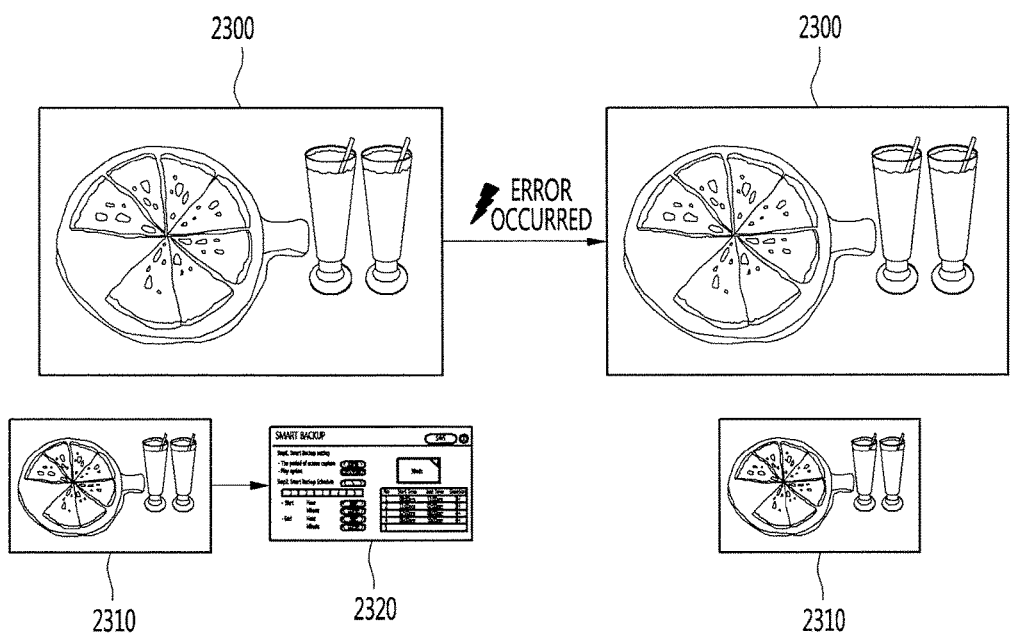
FIGS. 23 to 25 include diagrams and a flowchart illustrating an example in which a digital signage according to an embodiment of the present invention displays a captured image when an error event is generated.

The digital signage 2100 according to the embodiment of the present invention can detect an error event (errorEvent) signal in the process of outputting the predetermined advertisement content 2110 (S2160). Further, the digital signage 2100 can output the backup image 2125 stored in the memory instead of the advertisement content 2110 (S2170). Accordingly, the user of the digital signage 2100 can continuously display the predetermined backup image even when the error event is generated. An error event signal includes an error in displaying the content on the display and an error in receiving the content from a server FIGS. 23 and 25 are diagrams illustrating an example in which a digital signage according to an embodiment of the present invention displays a captured image when an error event is generated. The digital signage 2300 according to the embodiment of the present invention can output predetermined advertisement content 2310 at a predetermined period (S2510). The digital signage 2300 can repeatedly output a plurality of pieces of advertisement content. Further, a user can specify an output time per advertisement content, which will be described in detail with reference to FIG. 24.

The digital signage 2300 for outputting the plurality of pieces of advertisement content at the predetermined period can capture an image displayed through the display at a predetermined period (S2520). In addition, the digital signage 2300 can map the captured image 2310 to capture time information and store the captured image in the memory (S2530).

The digital signage 2300 can detect an error event (error-Event) signal at a predetermined point of time (S2540). Further, the digital signage 2300 can output a most recently captured image 2310 on the display when an error event signal is generated (S2550). In addition, as another embodiment, the digital signage 2300 can extract information on the advertisement content to be output based on information on a time when the error event signal is generated (S2560). In addition, the image captured when the advertisement content is output can be extracted from pre-stored captured images and output on the display (S2570).

Thus, as shown in FIG. 23, the controller can display a first set of images of content during a first predetermined time interval, capture and store the first set of images in the memory, display a second set of images of content during a second predetermined time interval, capture and store the second set of images in the memory, in response to a first error event signal indicating an error has occurred in displaying at least one image included in the first set of images, display the stored first set of images in a looping manner, and in response to a second error event signal indicating an error has occurred in displaying at least one image included in the second set of images, display the stored second set of images in a looping manner.

For example, the first set of images can be breakfast images corresponding to breakfast advertisement content for a restaurant such as McDonald's, etc. and the second advertisement content corresponding to lunch advertisement content for the restaurant. The plurality of images may be five images captured during the first predetermined time interval and five images captured during the second predetermined time interval. When an error occurs during the first predetermined time interval, the controller can display the stored fives images in a looping error for the first or second predetermined time intervals. The error may be an error occurring when displaying the images, or an error occurred when downloading the content from a server.

Figure 24:
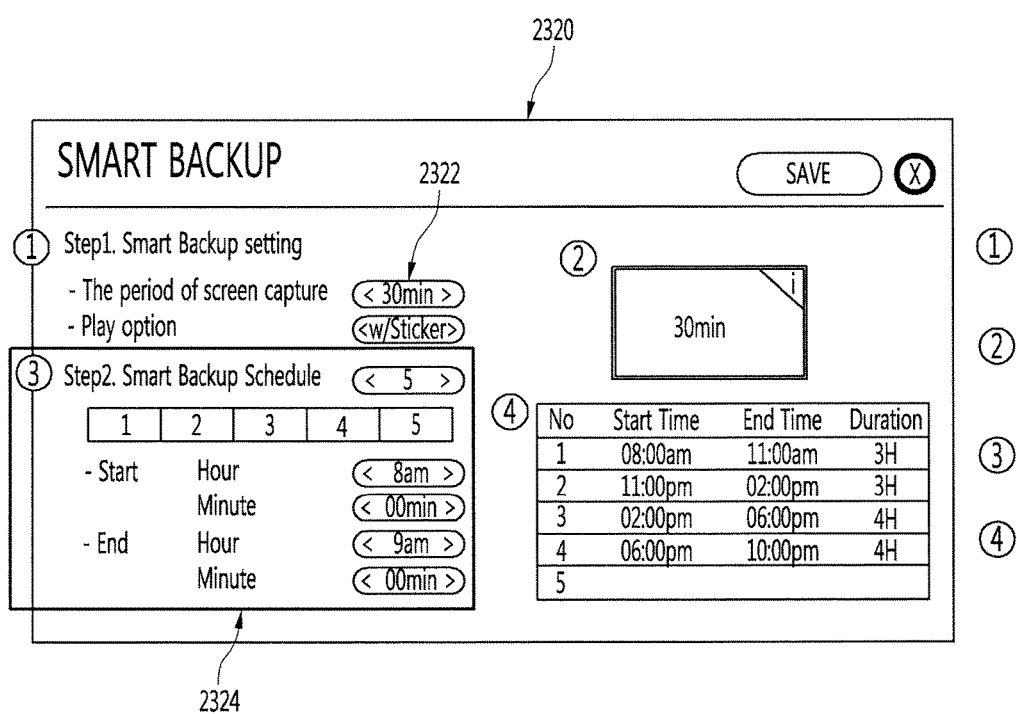
Figure 25:
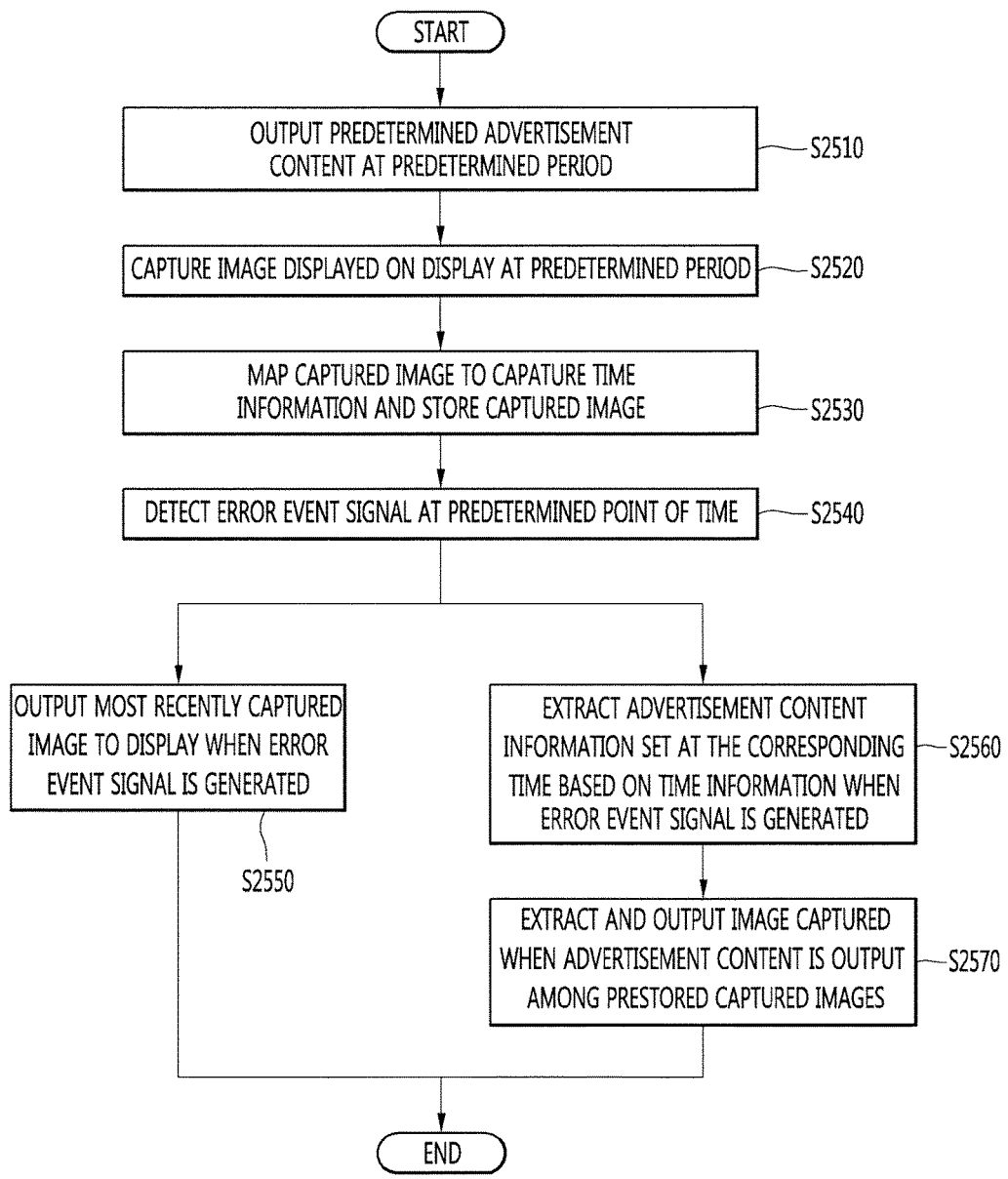

As shown in FIG. 24, the user of the digital signage 2300 according to the embodiment of the present invention can control settings of the captured image in a backup image setting menu 2320. For example, the user can control the backup period setting item 2322 of the backup image capture setting menu 2320 to control an image capture period. The image capture period can be set to 30 minutes as a default. In addition, the user can set when each piece of advertisement content is output through the advertisement content output time setting item 2324 of the backup image capture setting menu 2320. For example, the user can freely set the time when the advertisement content is output, such that first advertisement content is output from 8:30 AM to 11:00 AM and second advertisement content is output from 11:00 AM to 3:00 PM. The digital signage 2300 of the present invention can determine when advertisement content is output and which advertisement content is output according to the advertisement content output time setting item 2324 of the backup image capture setting menu 2320.

Accordingly, the digital signage 2300 according to the embodiment of the present invention can output a captured image of a most recently output advertisement content or a captured image of advertisement content output at a corresponding time even when an error event is generated. Therefore, it is possible to continuously output advertisement content originally desired by the user even when the error event is generated.

FIG. 26 is a diagram illustrating an example in which a digital signage according to an embodiment of the present invention displays an error event indicator on a captured image. The digital signage according to the embodiment of the present invention can output a captured image instead of advertisement content when an error event is generated and output an error event indicator on the captured image.

For example, as shown in (a) of FIG. 26, the digital signage can display a first error event indicator 2615 at any one of the left, right, upper and lower corners of a first captured image 2610. In addition, as shown in (b) of FIG. 26, the digital signage can display a second error event indicator 2625 in any one of the upper and lower regions of a second captured image 2620. Generally, it may be difficult for the user of the digital signage to determine whether the error event is currently generated only using the captured image. However, it is possible to easily recognize that the error event is generated through the error event indicators 2615 and 2625 and to rapidly correct a signage error.

Figure 27:
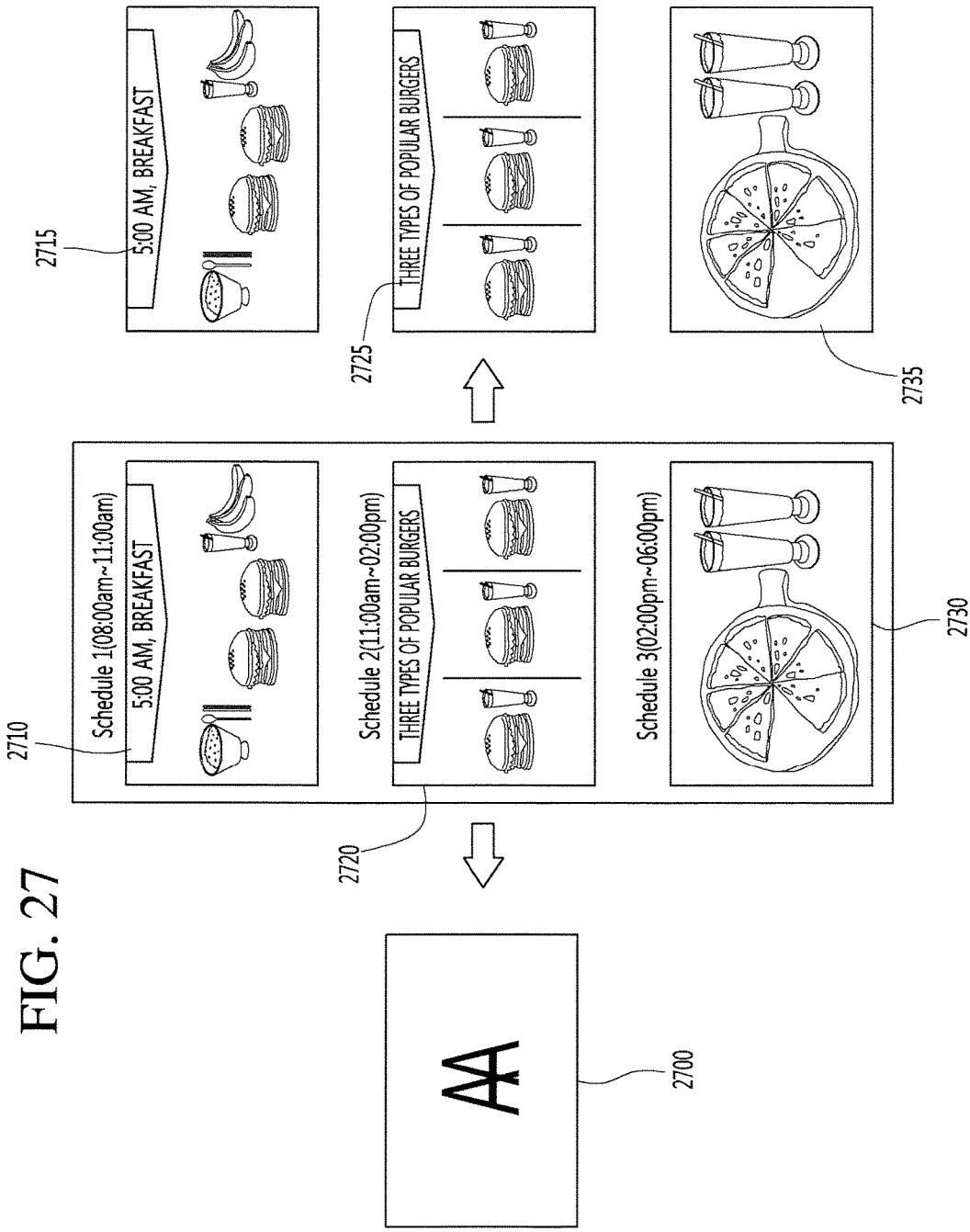
FIG. 27 is a diagram illustrating another example in which a digital signage according to an embodiment of the present invention displays a captured image when an error event is generated.

Next, FIG. 27 is a diagram illustrating another example in which a digital signage according to an embodiment of the present invention displays a captured image when an error event is generated. As described with reference to FIGS. 21 and 22, the digital signage according to the first embodiment of the present invention can store a predetermined backup image 2700 in an internal or external memory. When the error event is generated, the predetermined backup image 2700 can be output to the display.

As described with reference to FIGS. 23 to 25, the digital signage according to a second embodiment of the present invention can capture and store advertisement content at a predetermined period. When the error event is generated, the digital signage according to the second embodiment of the present invention can extract and output, to the display, an image most recently captured after the error event is generated or captured images 2710, 2720 and 2730 of the advertisement content output when the error event is generated.

Further, a digital signage according to a third embodiment of the present invention can extract and output, to the display, previous-day captured images 2715, 2725 and 2735 stored in the memory, if there is no captured image of advertisement content output when the error event is generated. For example, an error event can be generated immediately after 8:00 am which is the output time of first advertisement content having a first schedule time (from 8:00 am to 11:00 am). In this instance, the digital signage according to the third embodiment of the present invention does not store the captured image of the first advertisement content on that day. Rather, the digital signage can extract and output the captured image 2715 of the first advertisement content stored in the memory on the previous day to the display. A method of outputting the captured image 2725 of second advertisement content and a captured image 2735 of third advertisement content can be performed using the same method.

Accordingly, the digital signage according to the embodiment of the present invention can continuously output the same image as the advertisement content even when the error event is generated, thereby equally providing the advertisement content to users.

Figure 28:
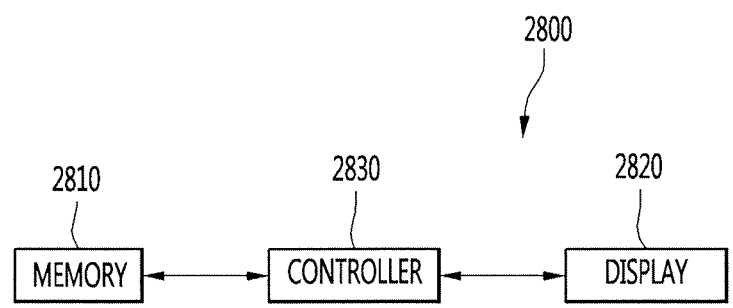
FIG. 28 is a block diagram showing a digital signage according to another embodiment of the present invention.

FIG. 28 is a block diagram showing a digital signage according to another embodiment of the present invention. As shown in FIG. 28, the digital signage 2800 includes a memory 2810, a display 2820 and a controller 2830 for controlling operation of the digital signage 2800. The controller 2830 can output an image of advertisement content, to capture and store the image of the advertisement content at a predetermined period, and to output the stored captured image to the display 2820 when a predetermined error event signal is detected.

In addition, the captured image output to the display 2820 of the digital signage 2800 according to the embodiment of the present invention can be an image stored at a time closest to a time when an error event signal is detected. The captured image output to the display 2820 of the digital signage 2800 according to the embodiment of the present invention can also be an image captured when the error event signal is detected among the captured images stored on a previous day. In addition, the controller 2830 of the digital signage 2800 according to the embodiment of the present invention can map the captured image to capture time information and store the captured image in the memory 2810 when the image of the advertisement content is captured and stored at a predetermined period.

Further, the controller 2830 of the digital signage 2800 according to the embodiment of the present invention can display and output an error event indicator in one region of the captured image. In the digital signage 2800 according to the embodiment of the present invention, the predetermined error event signal includes metadata having an errorEvent element including error event information related to at least one of the digital signage 2800 and a network.

In the digital signage 2800 according to the embodiment of the present invention, the metadata includes at least one of a contentInfo element including basic information of content, a contentplayLog element including log information related to content playback, a playerEvent element including event information of a player related to the content and a reserved element for other information or future use. In the digital signage 2800 according to the embodiment of the present invention, the errorEvent element can include at least one sub-element related to identifier information of a digital signage in which an error has been generated, information on a time when the error has been generated, information on a cause of the error and the location information of the digital signage.

Embodiments of the present invention provide several advantages. According to one of the embodiments of the present invention, by providing an interactional digital signage system, an advertiser, an advertisement creator and an advertisement content user can all be satisfied. According to another embodiment of the present invention, the advertiser can directly participate in the process of creating and controlling the advertisement to generate content suitable for the intention thereof and increase satisfaction and purchase desires of users to maximize advertisement effects. In addition, according to another embodiment of the present invention, it is possible to more easily and efficiently manage the digital signage system and, more particularly, to manage/process errors or malfunction in real time and to minimize a concomitant phenomenon.

The digital signage and the method of controlling the same according to the foregoing embodiments are not restricted to the embodiments set forth herein. Therefore, variations and combinations of the exemplary embodiments set forth herein can fall within the scope of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A digital signage comprising:
   a memory configured to store at least a first advertisement schedule and a second advertisement schedule;
   a display configured to display first advertisement content at the stored first advertisement schedule and display second advertisement content at the stored second advertisement schedule; and
   a processor configured to:
      capture a first image of the displayed first advertisement content and store the first image in the memory,
      capture a second image of the displayed second advertisement content and store the second image in the memory, and
      in response to a predetermined error event signal indicating an error has occurred in displaying advertisement content, display the first image on the display when a time of the error is within the first advertisement schedule, and display the second image on the display when the time of the error is within the second advertisement schedule,
   wherein the error event signal is a signal which includes information on the error among response signals of error checking signals sent by the processor.

2. The digital signage according to claim 1, wherein the error event signal includes an error in displaying the content on the display.

3. The digital signage according to claim 1, wherein the processor is further configured to:
   receive the content to be displayed from an external server, and
   wherein the error event signal includes an error in receiving the content from the server.

4. The digital signage according to claim 1, wherein the content comprises sales content.

5. The digital signage according to claim 1, wherein the processor is further configured to:
   continuously display the stored images in a looping manner.

6. The digital signage according to claim 1, wherein the processor is further configured to:
   in response to the displayed content including character information, capture an image including the character information, store the captured image in the memory and display the stored image on the display.

7. The digital signage according to claim 1, wherein the processor is further configured to:
   display an error event indicator corresponding to the error event signal in one region of the captured image.

8. The digital signage according to claim 1, wherein the processor is further configured to:
   in response to the error event signal, display text included in at least one of the stored images on the display.

9. The digital signage according to claim 1, wherein the memory is further configured to store a third advertisement schedule, and
   wherein the processor is further configured to:
   display third advertisement content at the stored third advertisement schedule,
   capture a third image of the displayed third advertisement content and store the third image in the memory, and
   in response to the predetermined error event signal indicating the error has occurred in displaying the advertisement content, display the third image on the display when the time of error is within the third advertisement schedule.

10. The digital signage according to claim 9, wherein the first advertisement schedule includes a first schedule of time in a first day, the second advertisement schedule includes a second schedule of time in the first day, and the third advertisement schedule includes a third schedule of time in the first day.

11. The digital signage according to claim 1, wherein the processor is further configured to:
   display a graphic user interface on the display including capture setting times at which the first image and the second image should be captured, and
   wherein the graphic user interface further includes advertisement display times for setting the first advertisement schedule and the second advertisement schedule.

12. The digital signage according to claim 1, wherein the error event signal includes metadata having an errorEvent element including error event information related to at least one of the digital signage and a network,
   wherein the metadata includes at least one of a contentInfo element including basic information of content, a contentplayLog element including log information related to content playback, a playerEvent element including event information of a player related to content and a reserved element for other data or future use, and
   wherein the errorEvent element includes at least one sub-element related to identifier information of the digital signage in which the error has been generated, information on the time when the error has been generated, information on a cause of the error and location information of the digital signage.

* * * * *